(12) United States Patent
Martinson et al.

(10) Patent No.: US 10,819,270 B2
(45) Date of Patent: Oct. 27, 2020

(54) HIGH TEMPERATURE SELECTIVE EMITTERS VIA CRITICAL COUPLING OF WEAK ABSORBERS

(71) Applicant: UCHICAGO ARGONNE, LLC, Chicago, IL (US)

(72) Inventors: Alex B. Martinson, Naperville, IL (US); Nari Jeon, Skokie, IL (US); Stephen K. Gray, Wheaton, IL (US); Jonathan J. Foley, IV, Wayne, NJ (US)

(73) Assignees: UChicago Argonne, LLC, Chicago, IL (US); William Paterson University of New Jersey, Wayne, NJ (US)

( * ) Notice: Subject to any disclaimer, the term of this patent is extended or adjusted under 35 U.S.C. 154(b) by 63 days.

(21) Appl. No.: 15/923,909

(22) Filed: Mar. 16, 2018

(65) Prior Publication Data
US 2019/0288636 A1    Sep. 19, 2019

(51) Int. Cl.
*H02S 10/30* (2014.01)
*H01L 31/054* (2014.01)
(Continued)

(52) U.S. Cl.
CPC .............. *H02S 10/30* (2014.12); *G06F 30/20* (2020.01); *H01L 31/0547* (2014.12);
(Continued)

(58) Field of Classification Search
CPC . H02S 10/30; H01L 31/0547; H01L 51/5265; H01L 33/46; H01L 33/10;
(Continued)

(56) References Cited

U.S. PATENT DOCUMENTS 6,271,461 B1    8/2001   Fraas et al.
2012/0312360 A1  12/2012  Shvets et al.
(Continued)

FOREIGN PATENT DOCUMENTS

WO   WO-2009/151679 A2   12/2009
WO   WO-2015/116268 A2    8/2015
(Continued)

OTHER PUBLICATIONS

Alexandre Mayer "Multi-objective genetic algorithm for the optimization of a flat-plate solar thermal collector" | vol. 22, No. S6 | Optics Express A1641 (Year: 2014).*
(Continued)

*Primary Examiner* — Michael Y Sun
(74) *Attorney, Agent, or Firm* — Foley & Lardner LLP

(57) ABSTRACT

Tailoring the emission spectra of a solar thermophotovoltaic emitter away from that of a blackbody, thereby minimizing transmission and thermalization loss in the energy receiver, is a viable approach to circumventing the Shockley-Queisser limit to single junction solar energy conversion. Embodiments allow for radically tuned selective thermal emission that leverages the interplay between two resonant phenomena in a simple planar structure—absorption in weakly-absorbing thin films and reflection in multi-layer dielectric stacks. A virtual screening approach is employed based on Pareto optimality to identify a small number of promising structures for a selective thermal emitter from a search space of millions, several of which approach the ideal values of a step-function selective thermal emitter.

8 Claims, 15 Drawing Sheets

(51) Int. Cl.

| | |
|---|---|
| G06F 30/20 | (2020.01) |
| H01L 27/02 | (2006.01) |
| H01L 33/10 | (2010.01) |
| H01L 33/46 | (2010.01) |
| H01L 51/52 | (2006.01) |
| G06F 30/00 | (2020.01) |
| G06F 119/08 | (2020.01) |
| G06F 111/06 | (2020.01) |
| G06F 119/06 | (2020.01) |
| G06F 30/337 | (2020.01) |
| G06F 30/398 | (2020.01) |
| G06F 9/455 | (2018.01) |
| G06F 11/36 | (2006.01) |
| G06F 16/2453 | (2019.01) |
| G06F 9/48 | (2006.01) |

(52) U.S. Cl.
CPC ........ *G06F 9/45516* (2013.01); *G06F 9/4831* (2013.01); *G06F 11/3628* (2013.01); *G06F 16/2453* (2019.01); *G06F 30/00* (2020.01); *G06F 30/337* (2020.01); *G06F 30/398* (2020.01); *G06F 2101/02* (2013.01); *G06F 2111/06* (2020.01); *G06F 2119/06* (2020.01); *G06F 2119/08* (2020.01); *G06F 2212/1041* (2013.01); *H01L 27/0207* (2013.01); *H01L 33/10* (2013.01); *H01L 33/46* (2013.01); *H01L 51/5265* (2013.01)

(58) Field of Classification Search
CPC . H01L 27/0207; G06F 17/5009; G06F 17/50; G06F 30/20; G06F 9/45516; G06F 11/3628; G06F 16/2453; G06F 2212/1041; G06F 2101/02; G06F 9/4831; G06F 2119/08; G06F 2111/06; G06F 2119/06; G06F 30/337; G06F 30/398; G06F 30/00; G06F 30/367
See application file for complete search history.

(56) References Cited

U.S. PATENT DOCUMENTS

| | | | |
|---|---|---|---|
| 2014/0102686 A1 | 4/2014 | Yu et al. | |
| 2014/0312700 A1* | 10/2014 | Catthoor | H01L 31/02021 307/77 |
| 2015/0288318 A1 | 10/2015 | Guler et al. | |
| 2016/0049897 A1 | 2/2016 | Noda et al. | |
| 2016/0164451 A1 | 6/2016 | Lenert et al. | |
| 2017/0085211 A1 | 3/2017 | Molesky et al. | |
| 2017/0085212 A1 | 3/2017 | Shaner et al. | |

FOREIGN PATENT DOCUMENTS

| | | |
|---|---|---|
| WO | WO-2016/182600 A1 | 11/2016 |
| WO | WO-2017/078163 A1 | 5/2017 |

OTHER PUBLICATIONS

Anil U. Mane "Atomic Layer Deposition of W:Al2O3 Nanocomposite Films with Tunable Resistivity" (Year: 2013).*
Datas, et al., "Ultra high temperature latent heat energy storage and thermophotovoltaic energy conversion," Energy, 107, pp. 542-549 (2016).
Rinnerbauer, et al., "High-temperature stability and selective thermal emission of polycrystalline tantalum photonic crystals," Optics Express, 21(9), pp. 11482-11491 (2013).
Yamaguchi, et al., "Multi-junction III-V solar cells: current status and future potential," Solar Energy, 79(1), pp. 78-85 (Jul. 2005).
Akselrod, et al., "Twenty-Fold Enhancement of Molecular Fluorescence by Coupling to a J-Aggregate Critically Coupled Resonator," ACS Nano 6(1), pp. 467-471 (2012).
Badescu, "Upper bounds for solar thermophotovoltaic efficiency," Renewable Energy 30(2), pp. 211-225 (2005).
Bierman, et al., "Enhanced photovoltaic energy conversion using thermally based spectral shaping," Nature Energy 1, 16068, 23 pages (2016).
Chan, et al., "Modeling low-bandgap thermophotovoltaic diodes for high-efficiency portable power generators," Solar Energy Materials and Solar Cells 94(3), pp. 509-514 (2010).
Datas, et al., "Steady state analysis of a storage integrated solar thermophotovoltaic (SISTPV) system," Solar Energy 96, pp. 33-45 (2013).
Dyachenko, et al., "Controlling thermal emission with refractory epsilon-near-zero metamaterials via topological transitions," Nature Communications 7, 11809, 8 pages (2016).
Fabreguette, et al., "Quartz crystal microbalance study of tungsten atomic layer deposition using WF6 and Si2H6," Thin Solid Films 488(1-2), pp. 103-110 (2005).
Foley, et al., "Design of emitter structures based on resonant perfect absorption for thermophotovoltaic applications," Optics Express 23(24), pp. A1373-A1387 (2015).
Garin, et al., "Three-dimensional metallo-dielectric selective thermal emitters with high-temperature stability for thermophotovoltaic applications," Solar Energy Materials and Solar Cells 134, pp. 22-28 (2015).
Gomez-Bombarelli, et al., "Design of efficient molecular organic light-emitting diodes by a high-throughput virtual screening and experimental approach," Nature Materials 15, pp. 1120-1127 (2016).
Green, "Solar cell fill factors: General graph and empirical expressions," Solid State Electronics 24(8), pp. 788-789 (1981).
Green, et al., "Solar cell efficiency tables (version 48)," Progress in Photovoltaics 24(7), pp. 905-913 (2016).
Inoue, et al., "Realization of narrowband thermal emission with optical nanostructures," Optica 2(1), pp. 27-35 (2015).
Johnson, et al., "A brief review of atomic layer deposition: from fundamentals to applications," Materials Today 17(5), pp. 236-246 (2014).
Kim, et al., "A Comparative Study of the Atomic-Layer-Deposited Tungsten Thin Films as Nucleation Layers for W-Plug Deposition," Journal of the Electrochemical Society 153(10), pp. G887-G893 (2006).
Lenert, et al., "A nanophotonic solar thermophotovoltaic device," Nature Nanotechnology 9, pp. 126-130 (2014).
Mane & Elam, "Atomic Layer Deposition of W:Al2O3 Nanocomposite Films with Tunable Resistivity," Chemical Vapor Deposition 19(4-6), pp. 186-193 (2013).
Mayer, et al., "Multi-objective genetic algorithm for the optimization of a flat-plate solar thermal collector," Optics Express 22(S6), pp. A1641-A1649 (2014).
Piper & Fan, "Total Absorption in a Graphene Monolayer in the Optical Regime by Critical Coupling with a Photonic Crystal Guided Resonance," ACS Photonics 1(4), pp. 347-353 (2014).
Piper, et al., "Total absorption by degenerate critical coupling," Applied Physics Letters 104, 251110, 4 pages (2014).
Qiu, et al., "Generation of electricity using InGaAsSb and GaSb TPV cells in combustion-driven radiant sources," Solar Energy Materials and Solar Cells 90(1), pp. 68-81 (2006).
Rinnerbauer, et al., "Metallic Photonic Crystal Absorber-Emitter for Efficient Spectral Control in High-Temperature Solar Thermophotovoltaics," Advanced Energy Materials 4(12), 1400334, 10 pages (2014).
Shockley & Queisser, "Detailed Balance Limit of Efficiency of p-n Junction Solar Cells," Journal of Applied Physics 32(3), pp. 510-519 (1961).
Song, et al., "Conversion of broadband energy to narrowband emission through double-sided metamaterials," Optics Express 21(26), pp. 32207-32216 (2013).
St-Gelais, et al., "Near-field radiative heat transfer between parallel structures in the deep subwavelength regime," Nature Nanotechnology 11, pp. 515-519 (2016).
Tischler, et al., "Critically coupled resonators in vertical geometry using a planar mirror and a 5?nm thick absorbing film," Optics Letters 31(13), pp. 2045-2047 (2006).

(56) References Cited

OTHER PUBLICATIONS

Ujihara, "Reflectivity of Metals at High Temperatures," Journal of Applied Physics 43(5), pp. 2376-2383 (1972).
Ungaro, et al., "Graded-index structures for high-efficiency solar thermophotovoltaic emitting surfaces," Optics Letters 39(18), pp. 5259-5262 (2014).
Ungaro, et al., "Solar thermophotovoltaic system using nanostructures," Optics Express 23(19), pp. A1149-A1156 (2015).
Winsemius, et al., "Temperature dependence of the optical properties of Au, Ag and Cu," Journal of Physics F: Metal Physics 6(8), pp. 1976.
Ye, et al., "Two-dimensional VO2 photonic crystal selective emitter," Journal of Quantitative Spectroscopy and Radiative Transfer 158, pp. 119-126 (2015).
Yeng, et al., "Enabling high-temperature nanophotonics for energy applications," Proceedings of the National Academy of Sciences 109(7), pp. 2280-2285 (2012).
Zhou, et al., "Solar thermophotovoltaics: reshaping the solar spectrum," Nanophotonics 5(1), pp. 1-21 (2016).
Zhou, et al., "Strong Influence of Ti Adhesion Layer on Electron-Phonon Relaxation in Thin Gold Films: Ab Initio Nonadiabatic Molecular Dynamics," ACS Applied Materials & Interfaces 9(49), pp. 43343-43351 (2017).
Zhuromsky, "Applicability of Effective Medium Approximations to Modelling of Mesocrystal Optical Properties," Crystals 7(1), pp. 1-12 (2017).

* cited by examiner

US 10,819,270 B2

HIGH TEMPERATURE SELECTIVE EMITTERS VIA CRITICAL COUPLING OF WEAK ABSORBERS

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to methods for optimal design of spectrally selective emitters.

BACKGROUND

The broad range of solar photon energies (0.5-4.1 eV) fundamentally limits single gap solar photovoltaics (PV) to the Shockley-Queisser limit of ~33% conversion efficiency, owing largely to photons with energies below the bandgap that do not contribute to photocurrent and photons with energies above the bandgap, which suffer losses from a variety of dissipation mechanisms including thermalization. The potential benefit of "reshaping" the solar spectrum to minimize these losses in a target PV cell is a central idea behind solar thermophotovoltaics (STPVs). In a STPV device, concentrated sunlight is incident upon an absorber that is in thermal contact with an emitter. The thermal radiation of this hot emitter may be tailored to match the bandgap of a PV cell, see FIG. 1, which allows for STPVs with a significantly greater fundamental limit (85%) than traditional single junction PVs (33%). More generally, thermophotovoltaics (TPVs) utilize the same selective emitter paired with a PV cell, but the heat source may come from a variety of non-solar sources, including waste heat generated by engines and reactors. Thus, TPV and STPV devices or, for short, S(TPV) devices, constitute a versatile clean energy strategy.

Photonic crystals of the refractory metals provide desirable benefits, but exhibit serious downsides. Photonic crystals have a tunable photonic bandgap. Refractory metals provide extreme resistance to heat. Photonic crystals of refractory metals are expensive to fabricate, such as by nanofabrication. Such photonic crystals also exhibit limited thermal stability and a large angle dependence of spectral efficiency. Numerous structures are possible, but optimal structures are difficult to identify other than by brute force and extensive testing and/or simulation.

SUMMARY

Some embodiments, relate to a method of identifying thermophotovoltaic structures comprising: determining parameters $P_i$ in a parameter space P for candidate emitter structures; for each parameter $P_i$, solving transfer matrix equations for the emissivity spectrum of each candidate emitter structure; for each parameter $P_i$ computing thermal emission spectrum of each candidate emitter structure; computing figures of merit for each candidate emitter structure; identifying whether a parameter $P_i$ is Pareto optimal and, if so, adding to a Pareto Front; and displaying a Pareto front for the parameter space P for the candidate emitter structures.

Another embodiments relates to a computer implemented system for identifying photonic crystals comprising a processor and a tangible, computer-readable medium operatively connected to the processor and including computer code. The computer code is configured to: determine emissivity for candidate emitter structures; select an absorber to pair with the candidate structures; determine spectral conversion efficiency ($\eta_s$) and useful power (P) as figures of merit; perform a Pareto optimization using the figures of merit; and determine the degree of critical coupling of at least a portion of the structures and the selected absorber.

In another embodiment, a photonic system comprises an absorber in thermal contact with an emitter; the emitter paired with a photovoltaic cell and configured to have a controllable temperature; the emitter having a first substrate, a Bragg reflector, and an optically tunable layer where the optically tunable layer and the Bragg reflector are critically coupled; and wherein the emitter generates useful power (P) by $$P = \int_0^{\lambda_{bg}} \frac{\lambda}{\lambda_{bg}} \rho(\lambda, T)\epsilon(\lambda)d\lambda$$

Where $\rho(\lambda, T)$ is the blackbody spectral density and $\epsilon(\lambda)$ is the emissivity spectrum of the emitter and further wherein pair emitter and photovoltaic cell have a conversion efficiency ($\eta_s$) of $$\eta_s = \frac{P}{P_{inc}} = \frac{\int_0^{\lambda_{bg}} \frac{\lambda}{\lambda_{bg}} \rho(\lambda, T)\epsilon(\lambda)d\lambda}{\int_0^{\infty} \rho(\lambda, T)\epsilon(\lambda)d\lambda}.$$

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
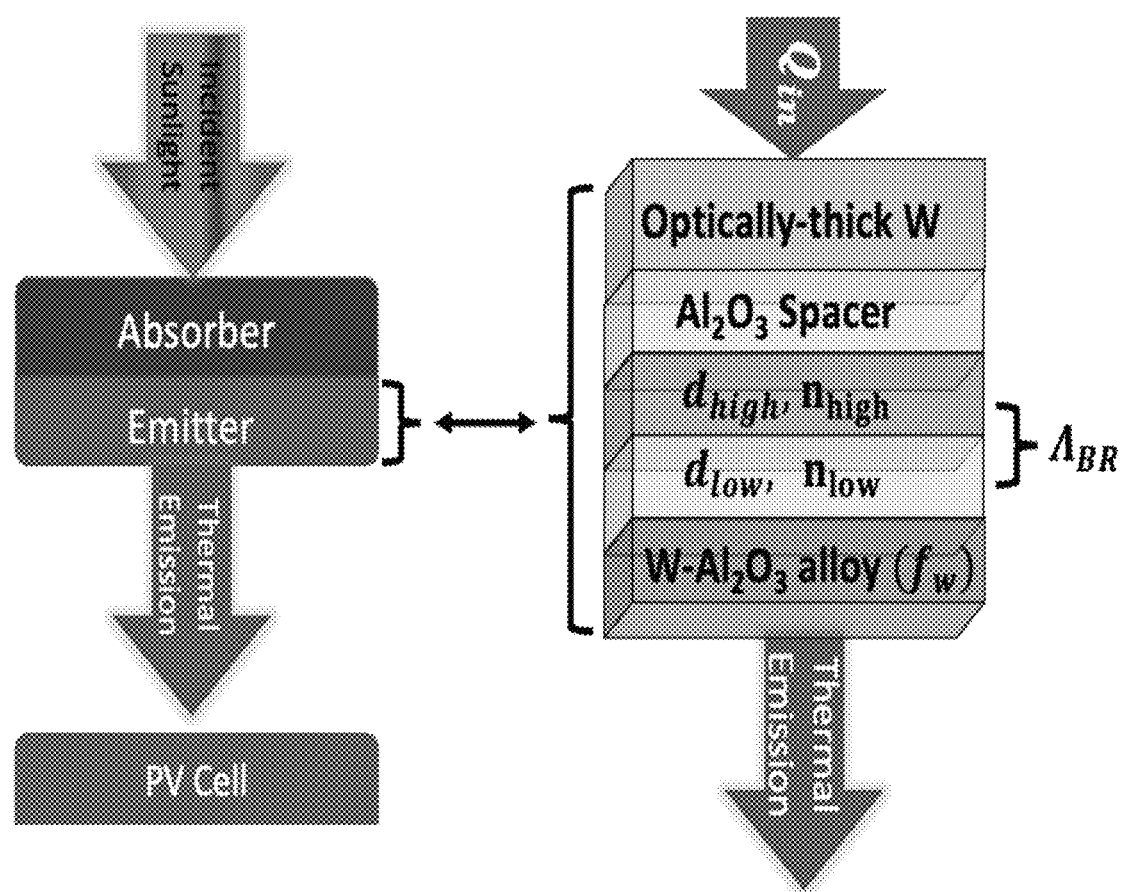
FIG. 1. Schematic of a STPV system (left) and representative illustration of the novel emitter design (right). Structural parameters that are varied in our virtual screening approach include the Bragg reflector (BR) dielectric layer thicknesses, $d_{high}$ and $d_{low}$, of $n_{high}$ and $n_{low}$ refractive indices, the number of such pair layers, $\Lambda_{BR}$, and the W volume fraction of the W—$Al_2O_3$ alloy, $f_w$. Heat ($Q_{in}$) flows from the absorber to the emitter via an optically-thick W layer, and spectrally-tailored thermal emission radiates from the W—$Al_2O_3$ side. Here the $n_{high}$ and $n_{low}$ are taken to be characteristic of $TiO_2$ and $SiO_2$, respectively.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a method of identifying photonic crystals enabling TPV above a threshold. In one embodiment, Pareto Front optimization is used with two competing figures of merit: 1) spectral efficiency and 2) spectral density. Critical coupling is utilized to develop the photonic crystals. FIG. 1 illustrates the critical coupling of a weak absorber with a refractory metal substrate. Between the refractory metal substrate and the weak absorber is a multi-layered structure. In the illustrated embodiment of FIG. 1, the layers and substructures are planar. The illustrated structure exhibits omnidirectional spectral selectivity. The multi-layered structure may consist of a plurality of dielectric stacks. In one embodiment, the multi-layered structure provides for reflectance of mid-to-far IR. The weak absorber comprises, in one embodiment, a metal-oxide alloy.

Tailoring the emission spectra of a solar thermophotovoltaic emitter away from that of a blackbody, thereby minimizing transmission and thermalization loss in the energy receiver, is a viable approach to circumventing the Shockley-Queisser limit to single junction solar energy conversion. Described herein are embodiments to radically tune selective thermal emission that leverages the interplay between two resonant phenomena in a simple planar structure—absorption in weakly-absorbing thin films and reflection in multi-layer dielectric stacks. A virtual screening approach is employed based on Pareto optimality to identify a small number of promising structures for a selective thermal emitter from a search space of millions, several of which approach the ideal values of a step-function selective thermal emitter. One of the more simple and optimal of these structures is experimentally realized, which includes a weakly-absorbing alloy with tailored optical properties fabricated by atomic layer deposition. The versatility of the design and fabrication approach enable measurement of a spectral density of 0.3 W/cm$^2$ sr with stable spectral efficiency of 35.2% at 1273K. Future experimental challenges to a more accurate realization of the optimal structures are also considered, including a weak absorber with more ideal optical constants and even greater thermal stability.

In one embodiment, critical coupling is utilized to identify optimal structures. For example, in a first step a promising an optical/photonic couple approach (critical coupling of a weak absorber) is identified. Next, select candidate materials based on desired properties such as, but not limited to, high temperature stability, similar thermal expansion coefficients, optical properties. Then, build a parameterized multi-layer stack with ranges based on the desired properties. Next, computationally screen for Pareto optimal targets. Then correlate the results with an optical approach to confirm. Finally, the selected materials can be experimentally fabricated to confirm expected results.

The broad range of solar photon energies (0.5-4.1 eV) fundamentally limits single gap solar photovoltaics (PV) to the Shockley-Queisser limit of ~33% conversion efficiency, owing largely to photons with energies below the bandgap that do not contribute to photocurrent and photons with energies above the bandgap, which suffer losses from a variety of dissipation mechanisms including thermalization. The potential benefit of "reshaping" the solar spectrum to minimize these losses in a target PV cell is a central idea behind solar thermophotovoltaics (STPVs). In a STPV device, concentrated sunlight is incident upon an absorber that is in thermal contact with an emitter. The thermal radiation of this hot emitter may be tailored to match the bandgap of a PV cell, see FIG. 1, which allows for STPVs with a significantly greater fundamental limit (85%) than traditional PVs. More generally, thermophotovoltaics (TPVs) utilize the same selective emitter paired with a PV cell, but the heat source may come from a variety of non-solar sources, including waste heat generated by engines and reactors. Thus, TPV and STPV devices (collectively, "S(TPV) devices"), constitute a versatile clean energy strategy.

For some embodiments, the selective thermal emitter is a critical component for (S)TPV devices. In certain embodiments described herein, this component is characterized with two figures-of-merit. In a further embodiment, temperature stability is used as a figure of merit, such as a third figure of merit. In other embodiments, other figures of merit are used. For example, for a particular absorber and PV system, and the operating configuration of absorber/emitter/PV, then the overall STPV system efficiency could be used as a figure of merit. Further, the spectral efficiency, spectral density, and STPV system efficiency all have in common that they can be used to rank device performance and each can be used as a figure of merit.

The useful power density, P, is the flux of photons that emitted with energies at or above the PV's bandgap, $N_{\lambda \leq \lambda_{BG}}$, multiplied by the bandgap energy, $E_{bg}$:

$$P = e_{bg} \cdot \dot{N}_{\lambda \leq \lambda_{bg}} \quad (1)$$

where the wavelength associated with the bandgap is $\lambda_{bg} = hc/E_{bg}$, with h being Planck's constant and c being the speed of light. The photon flux, in turn, depends on the temperature and spectral properties of the emitter, $$\dot{N}_{\lambda \leq \lambda_{bg}} = \int_0^{\lambda_{bg}} \frac{\lambda}{hc} \rho(\lambda, T) \epsilon(\lambda) d\lambda \quad (2)$$

where $\rho(\lambda, T)$ is the blackbody spectral density and $\epsilon(\lambda)$ is the emissivity spectrum of the emitter. Assuming the emitter structure is at thermal equilibrium, $\epsilon(\lambda)$ is taken to be the absorption spectrum of the emitter (Kirchoff's law). Therefore, the amount of useful power, (insofar as a particular PV cell is concerned) generated per unit area of the emitter surface (the useful power density) can be rewritten in a manner that permits straightforward computation once the temperature and emissivity are known:

$$P = \int_0^{\lambda_{bg}} \frac{\lambda}{\lambda_{bg}} \rho(\lambda, T) \epsilon(\lambda) d\lambda \quad (3)$$

The $\lambda/\lambda_{bg}$ factor captures the disadvantage of photons with energies greater than the bandgap energy (i.e., $\lambda < \lambda_{bg}$) since these photons will not be as efficiently used as those at exactly the bandgap energy. In this simple view, the spectral conversion efficiency ($\eta_s$) of the emitter/PV pair is then given by dividing P by the total emitted power density, $P_{inc}$:

$$\eta_s = \frac{P}{P_{inc}} = \frac{\int_0^{\lambda_{bg}} \frac{\lambda}{\lambda_{bg}} \rho(\lambda, T) \epsilon(\lambda) d\lambda}{\int_0^{\infty} \rho(\lambda, T) \epsilon(\lambda) d\lambda} \quad (4)$$

Both of these figures of merit play important roles in the overall efficiency of the (S)TPV device. A high $\eta_s$ is important for minimizing thermalization losses, while a large P is important for minimizing efficiency losses in the PV cell due to loss of open circuit voltage.

The emissivity, $\epsilon(\lambda)$, is a key quantity in determining both $\eta_s$ and P for a given candidate emitter structure. For example, if $\epsilon(\lambda)$ is a delta function at $\lambda = \lambda_{bg}$, then the emitter has perfect spectral efficiency ($\eta_s = 1$) but has low useful power density, P. Alternatively, if the emissivity has the form of a step function ($\epsilon(\lambda) = 1$ when $\lambda \leq \lambda_{bg}$ and $\epsilon(\lambda) = 0$ otherwise), then P is maximized, although $\eta_s$ will be less than unity. (A blackbody emitter is one that has $\epsilon(\lambda) = 1$ for all $\lambda$, and will have the same P as the step-function case but will have a lower $\eta_s$ due to a larger $P_{inc}$.) Optimal S(TPV) emitters will have thermal emission profiles between the two ideal limits of a step-function and a delta function.

From the above considerations, the design of selective emitters for (S)TPV applications requires achieving large values of two conflicting objectives, the useful power density, P, and the spectral efficiency, $\eta_s$. That is, P may increase at the expense of $\eta_s$ increasing and vice versa. Pareto optimality is a useful concept for considering such competing objectives. In this context, a Pareto optimal emitter structure is one with a P value that cannot be increased (by variation of structural parameters) without decreasing $\eta_s$ and vice versa. There can be many such Pareto optimal structures that form a curve or Pareto front in a relevant portion of the $\eta_s$-P space. A decision beyond the simple trade-off must then later be made regarding the acceptable magnitudes of the two objectives as to which structure along a Pareto front is best for an application at hand. Pareto analysis has recently been used in other virtual design approaches, including the design of solar absorbers and the design of molecules for efficient organic light emitting diodes.

A variety of planar and nanostructures have been explored in search of high-performance selective emitters, several of which are summarized in Table 1. The greatest $\eta_s$ simulated to date is ~59% from a W photonic crystal (2D square array of cylindrical holes) fabricated via interferometric lithography using a trilayer resist process. Among experimental studies of high temperature emission, the highest reported $\eta_s$ is ~35% from a HfO$_2$-coated Ta photonic crystal. A more detailed comparison should also consider steep emittance angles—conditions under which the P and/or $\eta_s$ performance of many designs quickly declines. Furthermore, the metrics for many of the reported emitters are based on simulations alone or on room temperature reflectance measurements, leaving much room for evaluation of P and $\eta_s$ at useful operating temperatures (>1200 K). As shown in Table 1, we identify simple simulated structures with record $\eta_s$ while maintaining similar or superior P. Likewise, the structures fabricated herein show record $\eta_s$ while maintaining a P similar to previous experimental reports. In one embodiment, P is from 1 to 10 W/cm$^2$ and $\eta_s$ is from 60 to 80%.

The structures under investigation in this work can be classified as L-layer planar structures with variations only along the z-axis and that are isotropic along the x- and y-axes, where L is the number of layers. The base layer (in thermal contact with the hypothetical absorber in FIG. 1) consists of an optically-thick tungsten (W) substrate. This layer is separated from a Bragg reflector (with alternating SiO$_2$ and TiO$_2$ layers) by a thin alumina layer that aids adhesion while having negligible impact on the optical properties; we note that the negligible impact of such adhesion layers cannot be universally assumed, and we will pursue fabrication strategies to avoid them in the future.

The Bragg reflector supports an alloy of tungsten in alumina with optical properties that are tunable with volume fraction. Spectrally-tailored thermal radiation is designed to be emitted from the surface of the thin alloy layer and collected by a InGaAsSb PV cell. The interplay between the Bragg reflector and the alloy layer plays a critical role in defining the emissivity of the structure, and by extension, its $\eta_s$ and P figures-of-merit. Under certain conditions, absorption resonances in the alloy layer may be critically coupled to the reflection resonances of the Bragg reflector, leading to strong selective thermal emission profiles of the composite structure. Similar critical coupling mechanisms have been utilized, for example, to realize extraordinary absorption in graphene monolayers/photonic crystal composites as well as enhanced absorption and Forster Resonance Energy Transfer (FRET) in thin films composed of J-aggregates critically coupled to a Bragg Reflector.

TABLE 1

Calculated and experimental performance of selective emitters considering only normal emission. See Eq. below for the definition of P1. The literature values of selective emittance in Table 1 may differ from some reports in which the figure of merit does not explicitly account for the disadvantage of photons with energies greater than the bandgap

|  | P$_\perp$[W/cm2sr] | $\eta_s$[%] | PV (bandgap) | T [K] | Method |
| --- | --- | --- | --- | --- | --- |
| W Photonic crystal | 1.9 | 58.9 | InGaAsSb (0.55eV) | 1500 | Simulation |
| VO$_2$ photonic crystal | 1.4 | 40.4 | In$_{0.69}$Ga$_{0.31}$As (0.62 eV) | 1500 | Simulation |
| W graded index | 3.0 | 56.2 | GaSb (0.73 ev) | 1750 | Simulation |
| This work (theory) | 0.6 | 64.5 | InGaAsSb (0.55 eV) | 1273 | Simulation |
| This work (theory) | 1.7 | 66.5 | InGaAsSb (0.55 eV) | 1500 | Simulation |
| This work (theory) | 3.4 | 66.4 | InGaAsSb (0.55 eV) | 1700 | Simulation |
| Ta photonic crystal | 1.8 | 48.6 | InGaAsSb (0.54 eV) | 1500 | Reflection @ RT |
| W/HfO$_2$ multilayer | 0.3 | 44.0 | InGaAsSb (0.55 eV) | 1273 | Reflection @ RT |
| Ta photonic crystal | 0.5 | 34.5 | InGaAs (0.62 eV) | 1255 | Emission @ 1255 K |
| Si/SiO$_2$/Pt photonic crystal | 0.1 | 19.3 | InGaAsSb (0.55 eV) | 939 | Emission @ 939 K |
| W/HfO$_2$ multilayer | 0.6 | 33.5 | InGaAsSb (0.55 eV) | 1273 | Emission @ 1273 K |
| This work (experiment) | 0.5 | 45.4 | InGaAsSb (0.55 eV) | 1273 | Emission @ 1273 K |
| This work (experiment) | 0.3 | 35.2 | InGaAsSb (0.55 eV) | 1273 | Emission @ 1273 K |

Embodiments described herein can be classified as L-layer planar structures with variations only along the z-axis and that are isotropic along the x- and y-axes, where L is the number of layers. The base layer (in thermal contact with the absorber in FIG. 1) consists of an optically-thick substrate, in the example embodiment, tungsten (W). The base layer may comprise high temperature materials, such as W, Mo, Ta, and Nb. In one embodiment, this base layer is separated from a Bragg reflector by a thin alumina layer that aids adhesion while having negligible impact on the optical properties. A Bragg reflector is a structure with alternating high/low refractive index materials. In one embodiment, the low refractive index layer may consist of materials with refractive indices in the range 1.4-1.75 with thicknesses between 50 and 400 nm, and the high refractive index layer consists of materials with refractive indices in the range 1.76-4.0 with thicknesses between 50 and 400 nm. The Bragg reflected should have high temperature stability and may include ZrO$_2$, Al$_2$O$_3$, MgO, HfO$_2$, SiO$_2$ TiO$_2$ or combinations thereof with high refractive index contrast between the materials such as alternating SiO$_2$ and TiO$_2$ layers. It will be In one embodiment, the Bragg reflector supports an alloy layer that is a high temperature stable material, such as transparent oxides coupled with weak absorbers, such as tungsten in alumina or metal nitrides, with optical properties that are tunable with volume fraction. Spectrally-tailored thermal radiation is emitted from the surface of the thin alloy layer and collected by a PV cell. The interplay between the Bragg reflector and the alloy layer plays a critical role in defining the emissivity of the structure, and by extension, $\eta_s$ and P figures-of-merit.

Under certain conditions, absorption resonances in the alloy layer may be critically coupled to the reflection resonances of the Bragg reflector, leading to strong selective thermal emission profiles of the composite structure. The condition for critical coupling is that the absorption resonance frequency and bandwidth of the thin-film alloy layer should match the resonance frequency and bandwidth associated with the stored energy spectrum of the Bragg reflector. Similar critical coupling mechanisms have been utilized, for example, to realize extraordinary absorption in graphene monolayers/photonic crystal composites, as well as enhanced absorption and Forster Resonance Energy Transfer (FRET) in thin films composed of J-aggregates critically coupled to a Bragg Reflector. In our design, the conditions for critical coupling between the alloy layer and the Bragg reflector are as follows: the frequency of resonant absorption in the alloy layer is equal to the frequency of resonant reflection in the Bragg reflector, and the absorption rate of the alloy layer is equal to the leakage rate of the Bragg reflector. The resonance frequencies and leakage rates of Bragg reflectors are tuned through geometry and choice of material. Similarly, the absorption frequency and rate in metal-in-dielectric alloys can be tuned through choice of materials and volume fraction of the alloy. The tungsten-alumina alloys simulated here exhibit a weak resonant absorption in the near-IR (~1500 nm), which is ideal for (S)TPV applications.

Our virtual screening approach utilizes multi-layer Fresnel theory calculations via the transfer matrix equation to determine the absorbance (and thus emissivity) for million candidate structures. The figures of merit P and $\eta_s$ when paired with a common low-bandgap PV, InGaAsSb ($\lambda_{bg}$=2254 nm, $E_{bg}$=0.55 eV) were determined and Pareto optimal points were identified. Then, a metric was defined that quantifies the degree of critical coupling in our structures (see Equation 6) and show that high degrees of critical coupling are correlated with Pareto optimality. One Pareto optimal structure exhibits excellent computed performance: $\eta_s$=66% and $P_\perp$=3.4 W/cm$^2$ sr at 1700K. At 1500K the same structure is also predicted to exhibit record $\eta_s$, with P also among the highest reported to date (see Table 1). A related Pareto optimal structure with excellent $\eta_s$ (60%) and even greater $P_\perp$ (3.9 W/cm$^2$ sr) at 1700K was targeted for experimental fabrication with and without the weak absorber and subsequently characterized at high temperature to identify potential limitations in experimental feasibility and stability. Although the weak absorber fabricated was found to have non-ideal optical properties and limited thermal stability, the performance after accounting for non-idealities in each component layer was found to resemble theoretical predictions. The spectral emissivity of a Pareto optimal structure without alloy at 1373K exhibited record $\eta_s$=46.8% and a respectable $P_\perp$=0.8 W/cm$^2$ sr.

While specific examples are described herein, such should not be understood as limiting the scope of the invention. For example, various parameters may be optimized, individually or as a group. In theory the emitter temperature, layer thicknesses, real and imaginary refractive indexes, alloying fraction, and number of layers can all be optimized with approaches described herein. However, to simplify the variable space and provide experimental examples we have limited ourselves to a single substrate (tungsten) with set refractive index, a range of temperatures (500-2200K), the real and imaginary thicknesses of a few known high temperature material for Bragg reflector and absorber material, and sought solutions with a minimum number of layers to simplify fabrication.

The values to be optimized for are, in one embodiment, spectral efficiency and spectral density because these are directly linked to thermophotovoltaic conversion efficiency. The photovoltaics, which will utilize the emission from the described emitter stack best utilizes photons with a particular energy. The spectral efficiency attempts to mathematically capture the ideality of the energy spread of photons emitted. The spectra density describes how many of these photons. Similarly, there exist physical differences between the emitters described herein and prior art emitters, notably embodiments of emitter stacks are shown to exhibit a large degree of critical coupling compared to prior art emitters.

Supporting Calculations and Theory

Described below are supporting calculations and theory for described embodiments as well as the examples section that follows.

Angle Dependence of Spectral Efficiency

A perfect blackbody is taken to have a cosine angle dependence:

$$B(\theta,\lambda,T)=B(\lambda,T)\cos(\theta) \quad (S1)$$

where $$B(\lambda, T) = \frac{2hc^2}{\lambda^2} \frac{1}{\exp\left(\frac{hc}{\lambda kT}\right) - 1} \quad (S2)$$

Additionally, one can assume an equal admixture of s- and p-polarized emission at all angles. For real surfaces with emissivity that depends on polarization, angle, and wavelength, the thermally emitted power per unit wavelength per unit solid angle per unit area of the emitting surface can be given by $$B(\theta,\lambda,T)(\tfrac{1}{2}\epsilon_p(\theta,\lambda)+\tfrac{1}{2}\epsilon_s(\theta,\lambda))dA\,d\lambda d\Omega, \quad (S3)$$

such that the total useful power density averaged over the angles in the hemisphere enclosing the emitting surface is given by $$P = \int_0^{2\pi} d\phi \quad (S4)$$

$$\int_0^{\frac{\pi}{2}} \sin(\theta)d\theta \int_0^{\lambda_{bg}} d\lambda \frac{\lambda}{\lambda_{bg}} B(\lambda,\,T)\cos(\theta)\left(\frac{1}{2}\epsilon_P(\theta,\,\lambda) + \frac{1}{2}\epsilon_S(\theta,\,\lambda)\right).$$

For a perfect blackbody, $\epsilon_p(\theta,\lambda)=\epsilon_s(\theta,\lambda)=1$ for all angles and wavelengths, so the integration over all angles in the hemisphere contributes a factor of π to the spectral density of a blackbody:

$$\rho(\lambda,\,T) = \int_0^{2\pi} d\phi \int_0^{\frac{\pi}{2}} \sin(\theta)d\theta B(\lambda,\,T)\cos(\theta) = \frac{2\pi hc^2}{\lambda^5} \frac{1}{\exp\left(\frac{hc}{\lambda kT}\right) - 1}. \quad (S5)$$

Figure 2:
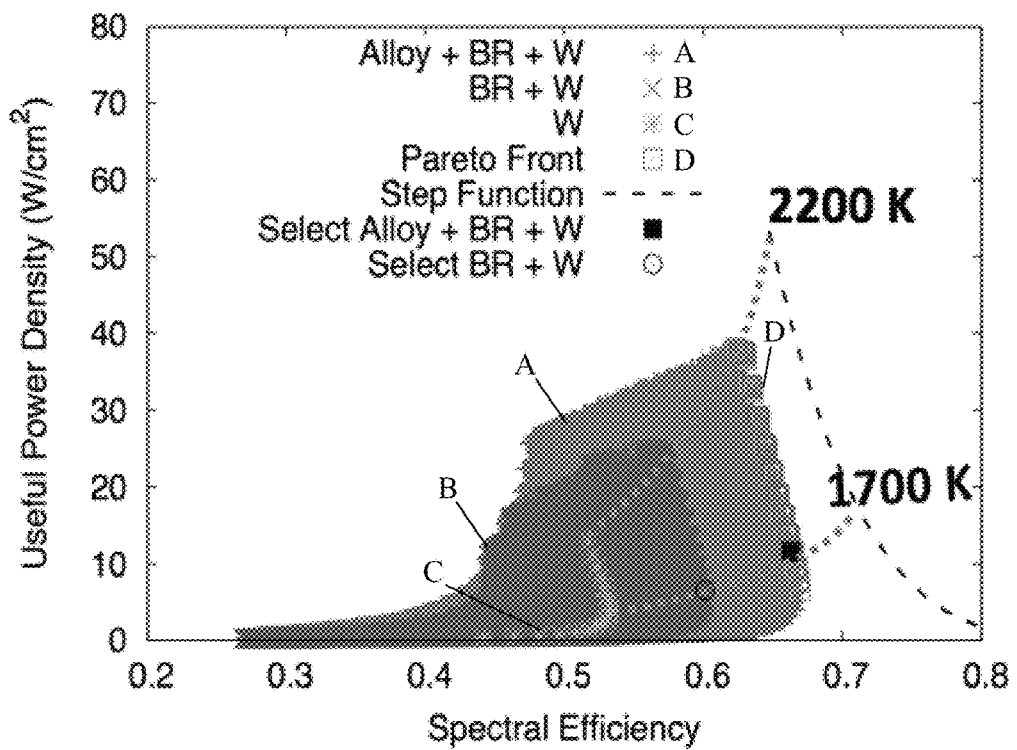
FIG. 2. Comparison of possible values for useful power density and spectral efficiency for a variety of planar structures at temperatures between 1200K and 2200K when $\lambda_{BG}$=2254 nm. The squares demark the Pareto front. The dashed lines intersect solutions at select temperatures (1700K and 2200K). An idealized emitter with step-function emissivity is also plotted for comparison.

In calculating the useful power density for generating FIG. 2 a simplifying assumption is made that $\epsilon_p(\theta,\lambda)=\epsilon_s(\theta,\lambda)=E_{normal}(\lambda)$, where $E_{normal}(\lambda)$ is computed from solving the Transfer Matrix Equations for the structure in question with $\theta_{inc}$=0; hence the use of $\rho(\lambda,\,T)$ in Equations (2), (3), and (4) in the main text. A more realistic, albeit computationally expensive, approach requires solving explicitly for $\epsilon_p(\theta,\lambda)$ and $\epsilon_s(\theta,\lambda)$ and numerically computing the integral in Equation (S5). This approach is used to examine the angle dependence of our target structure reported in Table 1 of the main text. Note that in Table 1, the Useful Power Density is reported only considering normal emission angles because the angle dependence is not known for many structures reported in the literature. The resulting normal Useful Power Density may be defined simply as $$P_\perp = \int_0^{\lambda_{bg}} \frac{\lambda}{\lambda_{bg}} B(\lambda, T)\epsilon(\lambda)d\lambda \qquad (S6)$$

Real and Imaginary Part of Refractive Index

Figure 3A:
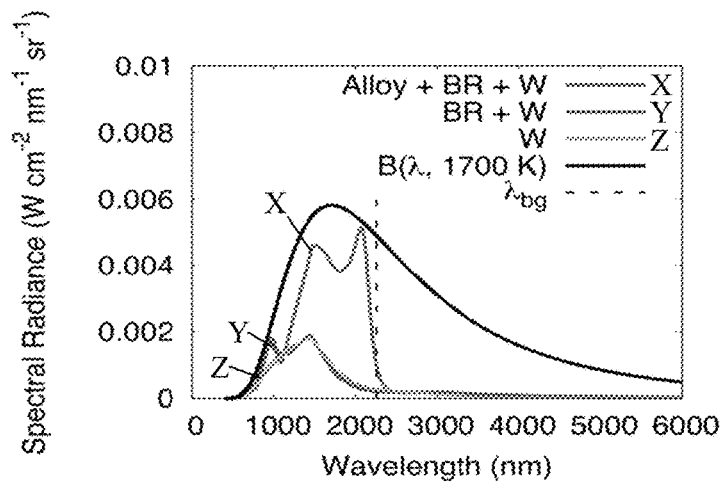
FIG. 3A. Theoretical normal thermal emission spectrum of selected Pareto-optimal structure with and without 20-nm thick W—Al$_2$O$_3$ alloy (f$_w$=75%) weak absorber, compared to a W-only and blackbody emitter at 1700K. Alloy+BR+W structure is predicted to have $\lambda_s$=66% and P$_\perp$=3.3 Wcm$^-$2sr$^{-1}$. A dashed line illustrates the $\lambda_{BG}$=2254 of the hypothetical energy-receiving PV.
Figure 3B:
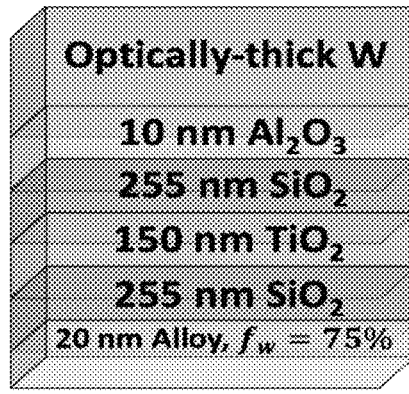
FIG. 3B. Schematic of a simple Pareto optimal structure selected for further examination.

The W refractive index data were adopted from Palik. Ellipsometric spectra were measured from fabricated oxides ($Al_2O_3$, $TiO_2$, $SiO_2$) and were fit by Cauchy models with $n=A+B/x^2$ and $k=0$, where A and B are fitting parameters and x is wavelength. For initial screening shown in FIG. 2 and FIG. 3, constant values of refractive indices are used for $TiO_2$ ($n=2.1$, $k=0$) and $SiO_2$ ($n=1.45$, $k=0$), and Cauchy-fit of measured n values was used for $Al_2O_3$.

Effective Medium Approximations

Two effective medium approximations are employed for the tungsten-alumina alloys. The first approximation is known as Maxwell-Garnett theory, within which the dielectric function of the effective medium is given by $$\epsilon_{alloy}^{MG} = \epsilon_D \frac{2f_W(\epsilon_W(\omega) - \epsilon_D) + \epsilon_W(\omega) + 2\epsilon_D}{2\epsilon_D + \epsilon_W(\omega) + f_W(\epsilon_D - \epsilon_W(\omega))}, \qquad (S7)$$

where $\epsilon_w(\omega)$ denotes the dielectric function of tungsten, $\epsilon_D$ denotes the dielectric function of the alumina dielectric material, and $f_w$ denotes the volume fraction of tungsten in the alumina surrounding medium. Bruggeman's effective medium approximation is computed as $$\epsilon_{alloy}^{Br.} = \frac{b + \sqrt{8\epsilon_W(\omega)\epsilon_D + b^2}}{4} \qquad (S8)$$

where $$b = 2(1-f_W)\epsilon_D + (2f_W - (1-f_W)\epsilon_W(w)) \qquad (S9)$$

In light of the above, Target and Actual Parameters were set for the materials as shown in Table S1.

TABLE S1

Target parameters of one selected Pareto optimal solution: $f_w$ volume fraction of tungsten; d: thickness of layer. BR is composed of two bilayers of $SiO_2$ layer and $TiO_2$ layer.

| | $f_w$ (alloy) | d (alloy) | d ($SiO_2$) | d ($TiO_2$) | d ($SiO_2$) | d ($TiO_2$) |
|---|---|---|---|---|---|---|
| Target | 20% | 32 nm | 224 nm | 179 nm | 224 nm | 179 nm |
| Experiment | 20 ± 1% | 32 ± 5 nm | 212 ± 2 nm | 169 ± 3 nm | 212 ± 5 nm | 162 ± 1 nm |

Pareto Optimal Solutions with Experimental Optical Constants

Figure 8:
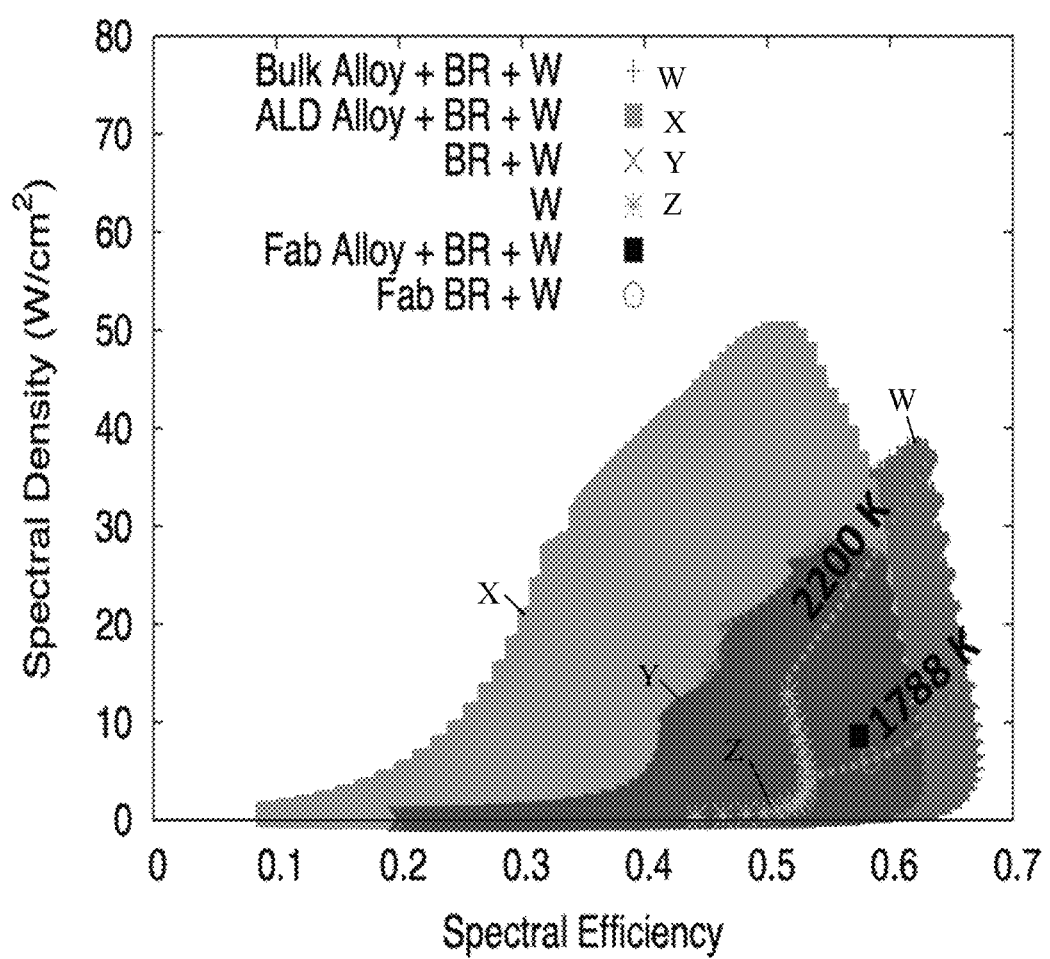
FIG. 8. Comparison of possible values for Spectral Density and Spectral Efficiency for a variety of planar structures at temperatures between 1200K and 2200K when $\lambda_{BG}$=2254 nm. The class of planar structures include optically-thick tungsten (denoted "W"), variable Bragg reflectors with an optically-thick tungsten substrate (denoted "BR+W"), and variable W/Al$_2$O$_3$ alloys with variable Bragg reflectors with an optically-thick tungsten substrate (denoted "X Alloy+BR+W"), where X is either Bulk or ALD. We utilize two models of the alloy: (1) where bulk W permittivity values are taken from known literature and Maxwell-Garnett effective medium approximation is used to model inclusions of W in Alumina (denoted "Bulk Alloy+BR+W"), and (2) where ellipsometry data of ALD W is used and the Bruggeman approximation is used to model inclusions of W in alumina (denoted "ALD Alloy+BR+W"). The permittivities for TiO$_2$ and SiO$_2$ are taken from ellipsometry of ALD-deposited samples, as well FIG. 9. X-ray diffraction spectra of alloy+BR+W and BR+W before and after the thermal emission measurements at 1373K. The three largest peaks at 40.1°, 58.1°, and 73.0° originate from W substrates.

FIG. 8 shows a comparison of possible values for Spectral Density and Spectral Efficiency for a variety of planar structures at temperatures between 1200K and 2200K when $\lambda_{BG}=2254$ nm. The class of planar structures include optically-thick tungsten (denoted "W"), variable Bragg reflectors with an optically-thick tungsten substrate (denoted "BR+W"), and variable W/$Al_2O_3$ alloys with variable Bragg reflectors with an optically-thick tungsten substrate (denoted "X Alloy+BR+W"), where X is either Bulk or ALD. Two models of the alloy are utilized: (1) where bulk W permittivity values are taken from Lipson, A.; Lipson, S. G.; Lipson, H., *Optical Pyhysics* (4th Edition), Cambridge University Press: Cambridge, 2011; pp 383 and Maxwell-Garnett effective medium approximation is used to model inclusions of W in Alumina ("Bulk Alloy+BR"), and (2) where ellipsometry data of ALD W is used and the Bruggeman approximation is used to model inclusions of W in alumina ("ALD Alloy+BR+W"). The permittivities for $TiO_2$ and $SiO_2$ are taken from ellipsometry of ALD-deposited samples, as well.

Bragg Reflector High Temperature Stability

Figure 9:
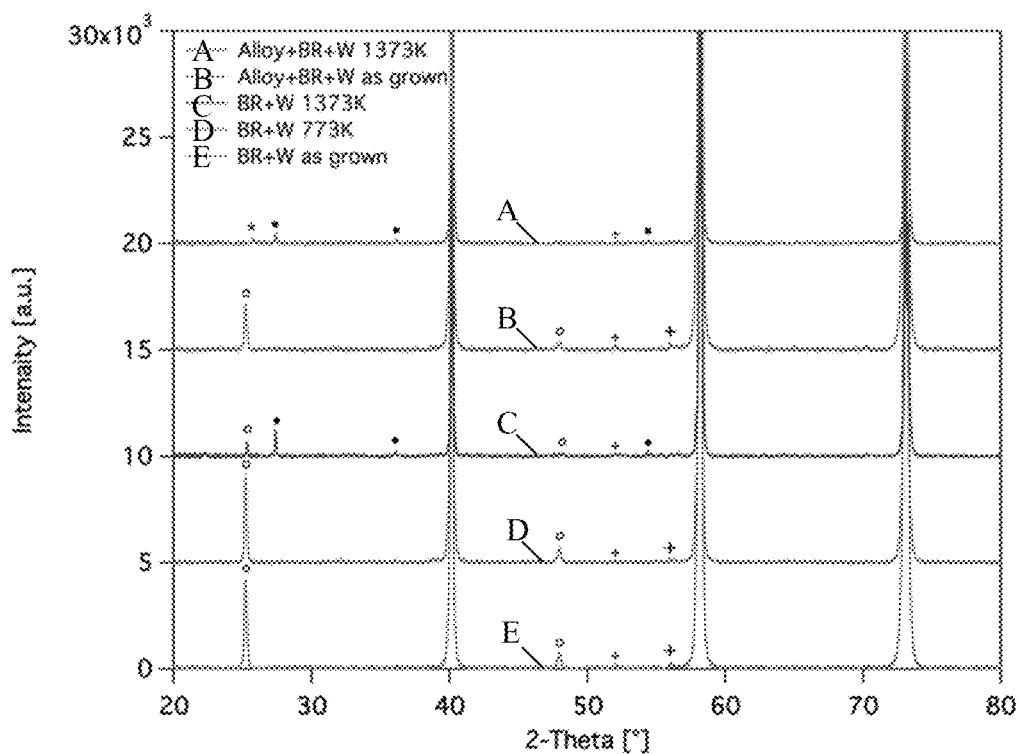

FIG. 9 shows X-ray diffraction spectra of alloy/BR/W and BR/W before and after annealing at 1,000° C. Amorphous $TiO_2$ (as grown) is crystallized to rutile (°) and anatase (●) phase upon annealing. In contrast, no crystalline peaks were detected for $SiO_2$ or $Al_2O_3$. Unassigned reflections marked as * are intrinsic to the W substrate as they are observed in the bare W substrate as received.

Figure 10:
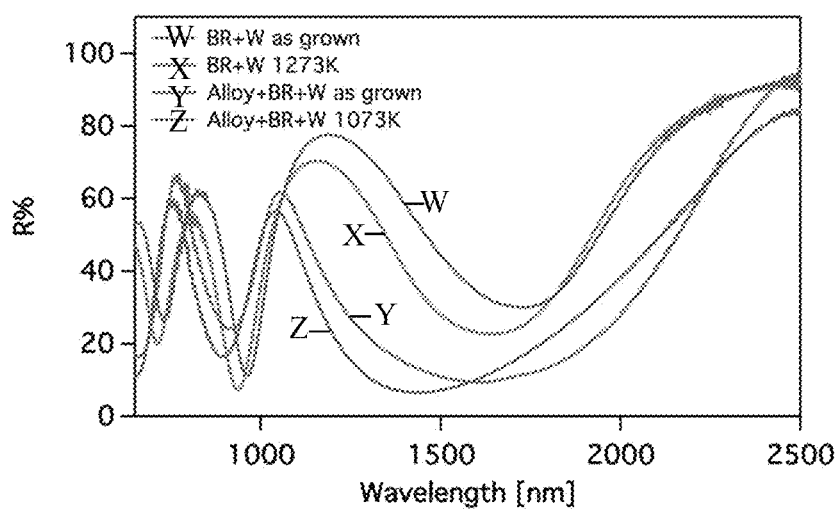
FIG. 10. Reflectance spectra of alloy+BR+W and BR+W before and after annealing under Ar atmosphere at 1073K for 2 hr and 1273K for 2 hr, respectively.

In order to understand the long-term and cyclic stability of the alloy/BR/W and BR/W structures, three samples were annealed at 1000° C. repeatedly for different times followed by reflectance spectra measurement after each annealing steps. FIG. 10 shows reflectance spectra of (a) alloy/BR/W and (b) BR/W after repeated annealing at 1000° C. In the reflectance spectra of BR/W structure, fringes below ~1,000 nm gradually blue-shifted and the overall reflectance intensity gradually decrease before stabilizing. The blue-shift of fringes maybe the result of film densification.

Similar to the trends observed in BR–W substrates, the fringes of alloy/BR/W samples were blue-shifted, and the reflectance decreased as the annealing cycles repeated. This suggests that the changes in reflectance of alloy/BR/W samples are mainly due to the changes in BR rather than the alloy layer.

Figure 11:
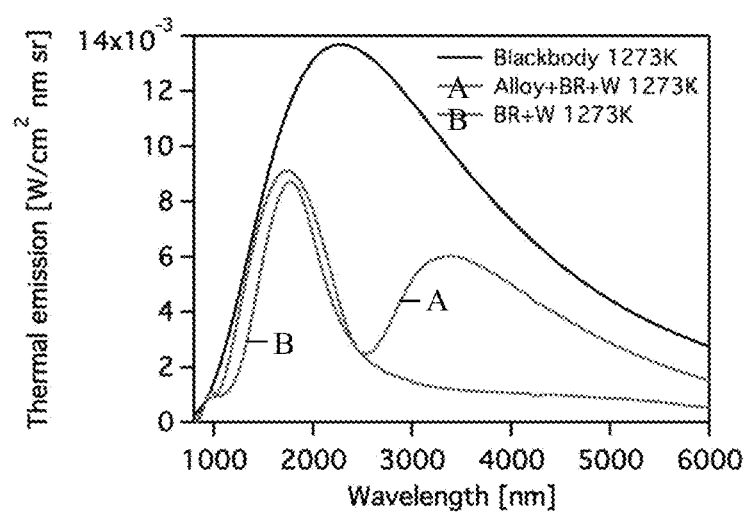
FIG. 11. Measured thermal emission spectra of alloy+BR+W and BR+W at 1273K.

Based on the calculated thermal emission spectra, alloy/BR/W is expected to have higher spectral density (3.3 W/cm$^2$) and spectral efficiency (44.1%) compared to BR/W (2.5 W/cm$^2$, 41.4%) under the well-controlled inert atmosphere. FIG. 11 shows thermal emission spectra calculated from reflectance spectra measured at room temperature after annealing at 1000° C. for 21 hr 30 min. The reflectance spectra below 2.5 μm and above 2.5 μm were collected by UV-vis-NIR spectrometer and FTIR spectrometer, respectively.

Transfer Matrix Equations

The Transfer Matrix Equations for an L-layer structure with variations only along the z-axis can be written as $$\begin{pmatrix} E_1^+ \\ E_1^- \end{pmatrix} = \begin{pmatrix} M_{1,1} & M_{1,2} \\ M_{2,1} & M_{2,2} \end{pmatrix} \begin{pmatrix} E_L^+ \\ E_L^- \end{pmatrix} \qquad (S10)$$

where the elements $M_{1,1}$ depend on the material properties (i.e. the refractive index n) and the geometry of each layer, as well as on the frequency and polarization of incident light. This formalism assumes that layer 1 and L are semi-infinite materials with real refractive indices; however, all intermediate layers have finite thickness and may consist of materials with complex refractive indices. The 2×2 M matrix can be computed from the following product of matrices:

$$\begin{pmatrix} M_{1,1} & M_{1,2} \\ M_{2,1} & M_{2,2} \end{pmatrix} = D_1^{-1} \left( \prod_{l=2}^{L-1} D_l P_l D_l^{-1} \right) D_L \quad \text{(S11)}$$

The P matrix is defined for each finite-thickness layer as $$P_l = \begin{pmatrix} \exp(i\phi_l) & 0 \\ 0 & \exp(-i\phi_l) \end{pmatrix} \quad \text{(S12)}$$

where $\phi_l = k_{z,l} d_l$ where $d_l$ is the thickness of the $l^{th}$ layer of the structure, $$k_{z,l} = \sqrt{\left(n_l \frac{\omega}{c}\right)^2 - \left(n_l \sin(\theta_1) \frac{\omega}{c}\right)^2} \quad \text{(S13)}$$

where $\theta_1$ is the angle of incidence of light at frequency $\omega$ upon the structure and $n_l$ is the refractive index of the $l^{th}$ layer at frequency $\omega$. If the incident light is s-polarized, then the D matrix for the $l^{th}$ layer has the form $$D_l = \begin{pmatrix} 1 & 1 \\ n_l \cos(\theta_l) & -n_l \cos(\theta_l) \end{pmatrix} \quad \text{(S14)}$$

while if the light is p-polarized, the D matrix for the $l^{th}$ layer has the form $$D_l = \begin{pmatrix} \cos(\theta_l) & \cos(\theta_l) \\ n_l & -n_l \end{pmatrix} \quad \text{(S15)}$$

where $\theta_l$ is the refraction angle in the $l^{th}$ layer determined by Snell's law.

The amplitudes $E_1^+$ and $E_1^-$ are interpreted as the incoming and outgoing wave amplitudes on the incident side, respectively; similarly, $E_L^-$ and $E_L^+$ are interpreted is the incoming and outgoing wave amplitudes on the terminal side, respectively. With access to the field amplitudes and wavevectors, a number of useful quantities may be computed. For example, the Fresnel reflection and transmission amplitudes may be computed as $$r = \frac{E_1^-}{E_1^+}$$

and $t = E_L^+$. For the analysis of reflection experiments, $E_1^+ = 1$ and $E_L^- = 0$ by convention. Consideration of Eq. (S1) under these conditions leads to expressions for the reflection and transmission amplitudes in terms of the elements of the M matrix, $$r = \frac{M_{2,1}}{M_{1,1}} \quad \text{(S16)}$$

$$t = \frac{1}{M_{1,1}} \quad \text{(S17)}$$

The reflection can then be calculated as $R = |r|^2$, the transmission as $$T = |t|^2 \frac{n_L \cos(\theta_L)}{n_L \cos(\theta_1)}.$$

The absorption at a given frequency, which can be taken to be equal to the emissivity by Kirchoff's law, can simply be computed as $\epsilon(\omega) = A(\omega) = 1 - T(\omega) - r(\omega)$. The transfer matrix equations can be used to compute the stored energy of the Bragg Reflector ($P_{BR}(\omega)$) as well, which is a key quantity for assessing the degree of critical coupling. Following the discussion by Piper and Fan, the amplitude associated with the stored energy in a lossless resonant reflector ($E_s$) can be related to the incoming and outgoing wave amplitudes according to $$E_S = \left| \frac{E_1^- + E_1^-}{\sqrt{2\gamma_l}} \right|^2 \quad \text{(S18)}$$

where $\gamma_l$ is the leakage rate associated with the Bragg reflector. From Eq. S9, the stored energy spectrum can be calculated for a given frequency as $$E_s = \frac{(r+1)(r^*+1)}{2\gamma_l} \quad \text{(S19)}$$

Figure 12:
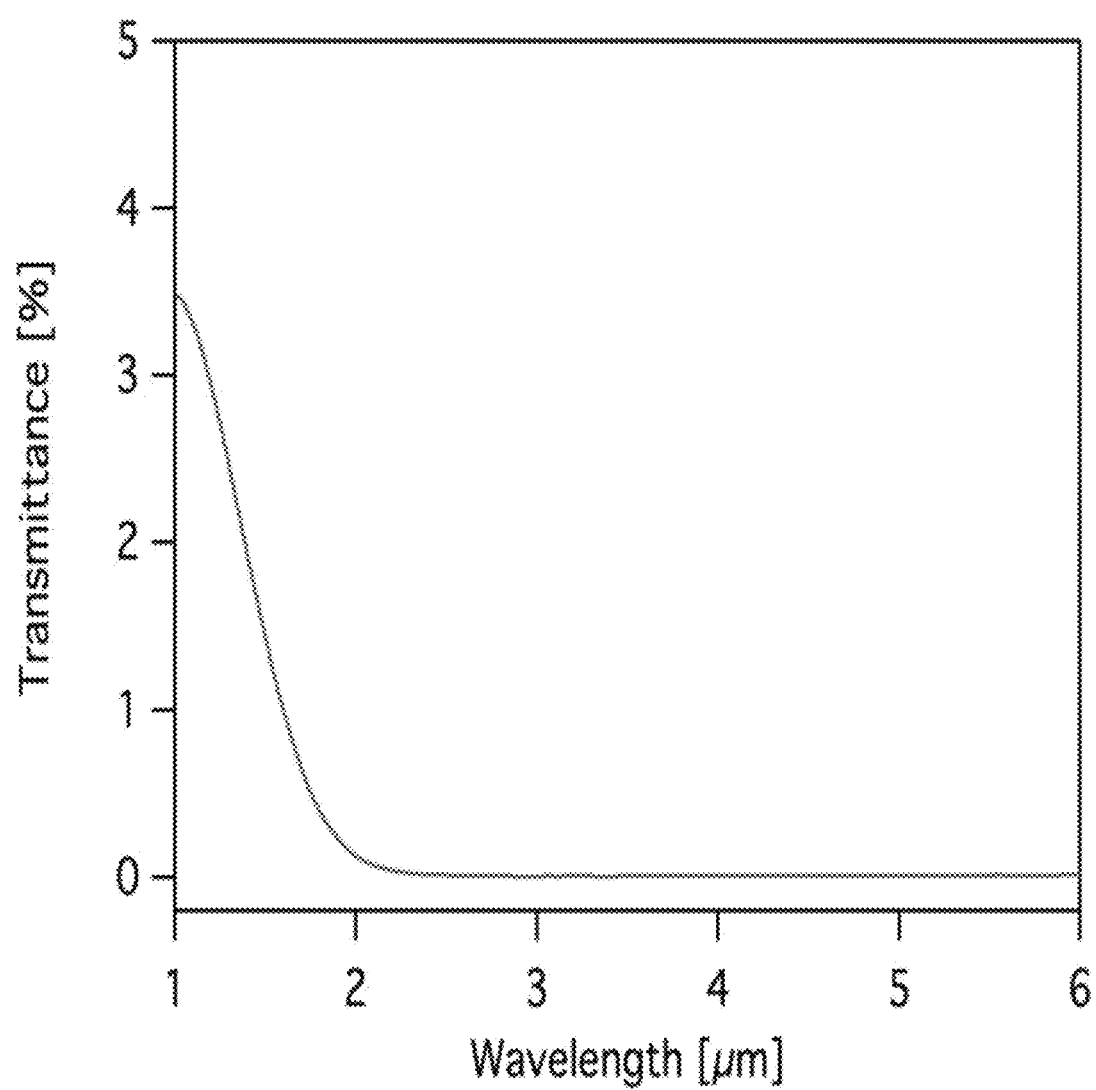
FIG. 12. Transmittance of SiC substrate.
Figure 13A:
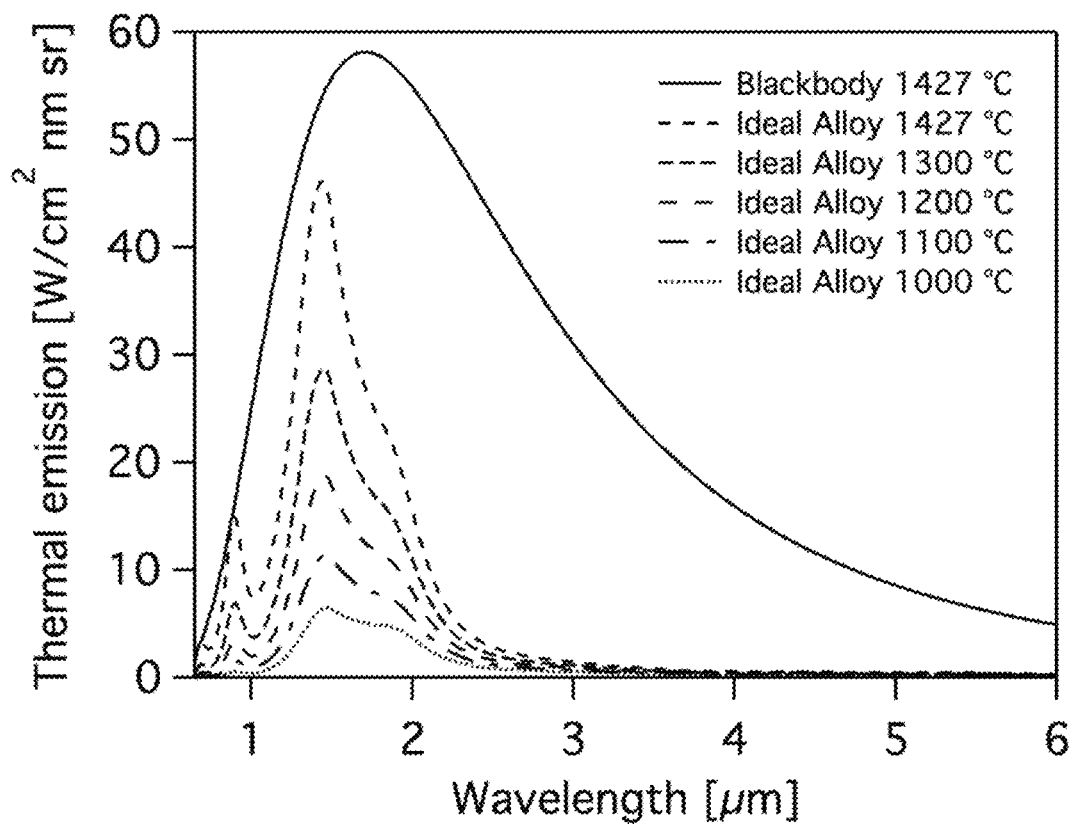
FIG. 13A. Calculated thermal emission spectra of an ideal alloy at varied temperatures.
Figure 13B:
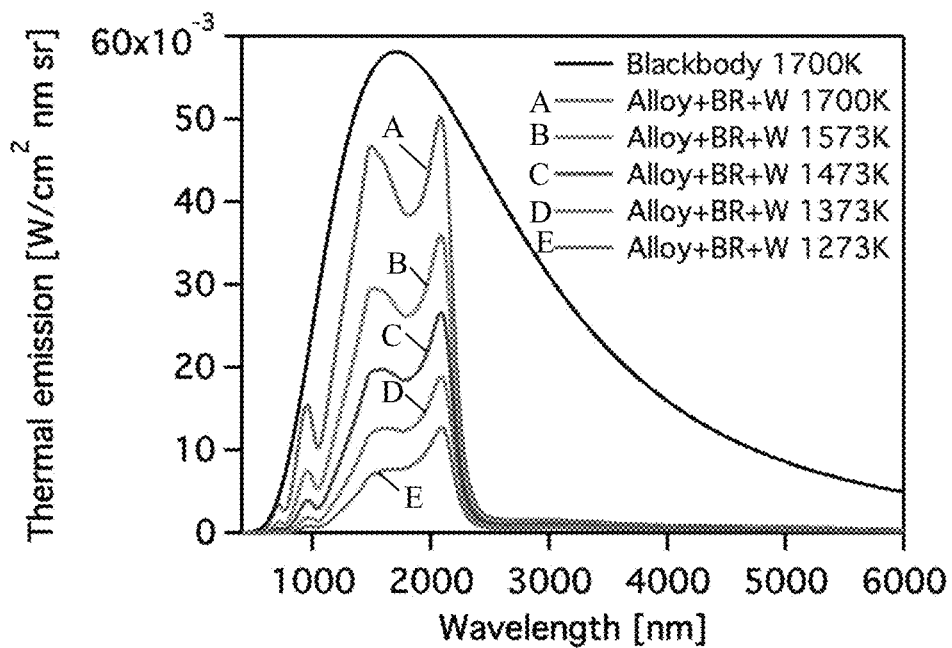
FIG. 13B. Calculated thermal emission spectra of designed alloy+BR+W structure at varied temperatures FIG. 14. Thermal emission spectra of BR+W at 1373K for varied layer thickness. Line A: 5% increased thickness from optimized structure; Line B: optimized structure; and Line C: 5% decreased thickness from optimized structure.

FIG. 12 illustrates the transmittance of SiC substrate.
Sensitivity Analysis for Experimental Variables
Temperature FIG. 13 shows the calculated thermal emission spectra of designed alloy+4 layer BR+W structure at varied temperatures. As operation temperature decreases from 1427° C. to 1000° C., the $\eta_s$ decrease marginally while the P dramatically decreases, see Table S2.

TABLE S2

Spectral density (P) and spectral efficiency (is) of alloy + BR + W at varied temperatures

| T [° C] | 1000 | 1100 | 1200 | 1300 | 1427 |
|---|---|---|---|---|---|
| P [W/cm²] | 2.0 | 3.3 | 5.2 | 7.8 | 12.1 |
| $\eta_s$[%] | 55.4 | 57.5 | 58.8 | 59.5 | 59.8 |

Oxide Layer Thickness

Figure 14:
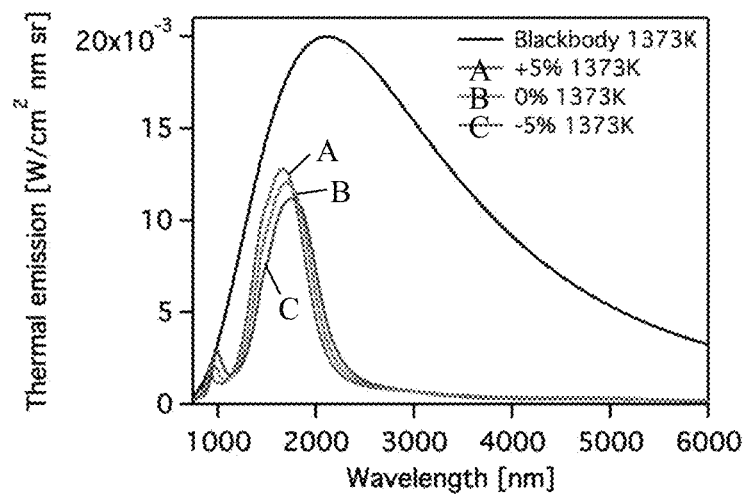

FIG. 14 shows thermal emission spectra of BR/W at 1000° C. for varied layer thickness. Red line is the measured spectrum. Green line is the spectrum calculated from the model with each layer thickness measured by spectroscopic ellipsometry. Blue line is the spectrum calculated from the model with the desired layer thickness.

Further, the fabricated BR/W has slightly thinner oxide layers by ~6% on average than the intended structure. The peak emission of the fabricated sample (green curve) blueshifts by 0.09 μm compared to that of the designed structure (blue curve). As a result, both spectral density and spectral efficiency decrease by ~3%. The measured spectrum displays undesirable thermal emission in mid IR range (>2.3 μm, see main text), which results in a significantly reduction in $\eta_s$. Table S3 summarizes the data.

TABLE S3

Spectral density P and spectral efficiency lis of alloy/BR/W

| Sample | Measured Emission | Measured Thickness | Ideal Thickness |
|---|---|---|---|
| P [W/cm$^2$] | 2.0 | 1.8 | 1.9 |
| $\eta_s$ [A] | 34.1 | 52.6 | 54.5 |

Alloy Model

Figure 15:
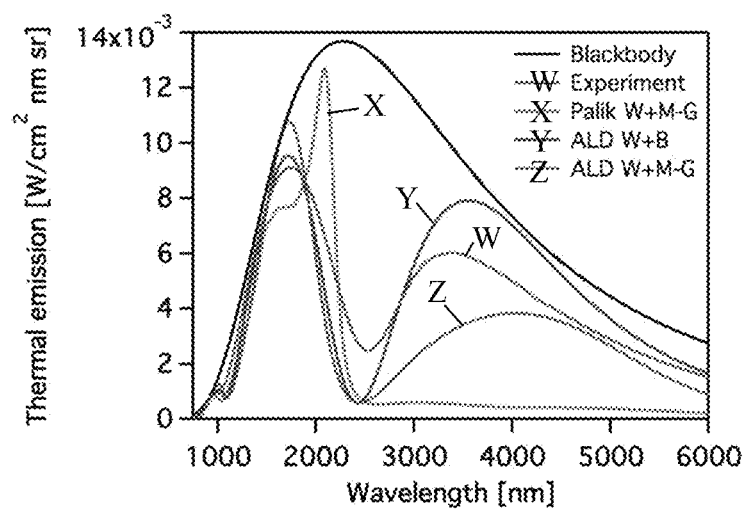
FIG. 15. Thermal emission spectra of Alloy+BR+W at 1273K calculated from varied alloy models and optical constants of W. Line W: measured spectrum; Line X: Maxwell-Garnett model with optical constants of Palik W; Line Y: Bruggeman model with optical constants of ALD W; Line Z: Maxwell-Garnett model with optical constants of ALD W.
Figure 16:
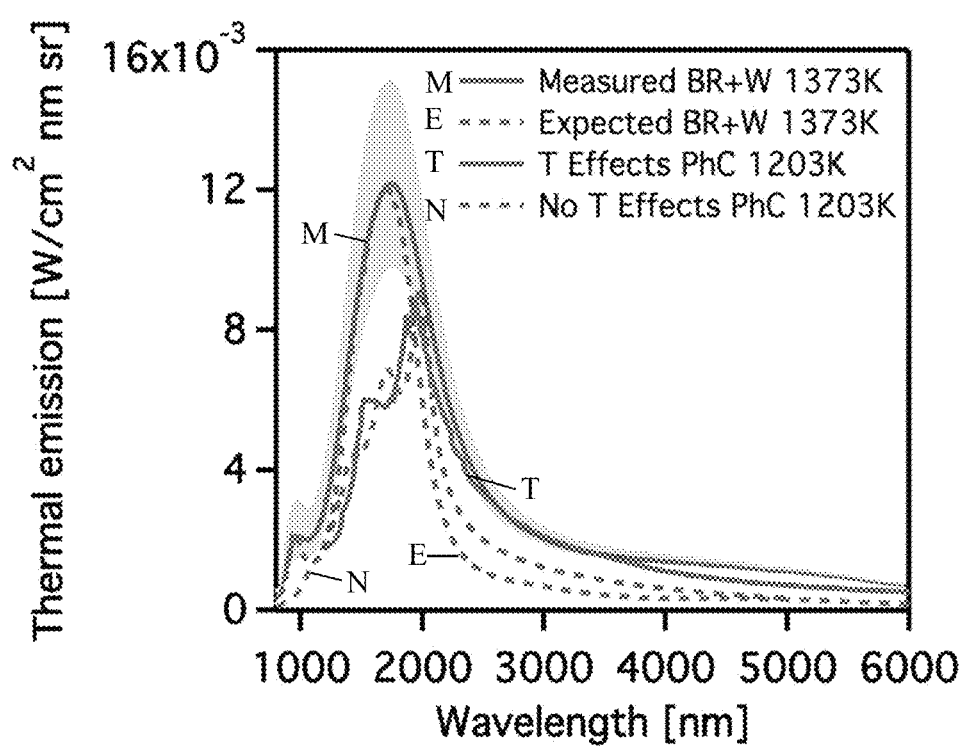
FIG. 16. Comparison of thermal emission spectra of BR+W and W photonic crystal (PhC) reported elsewhere. Lines M and E are the measured spectrum and simulated spectrum of BR+W at 1373K. Lines T and N are the simulated spectra of W PhC (design II) at 1203K with and without considering the enhancement of thermal emission in infrared range at the temperature.
Figure 17A:
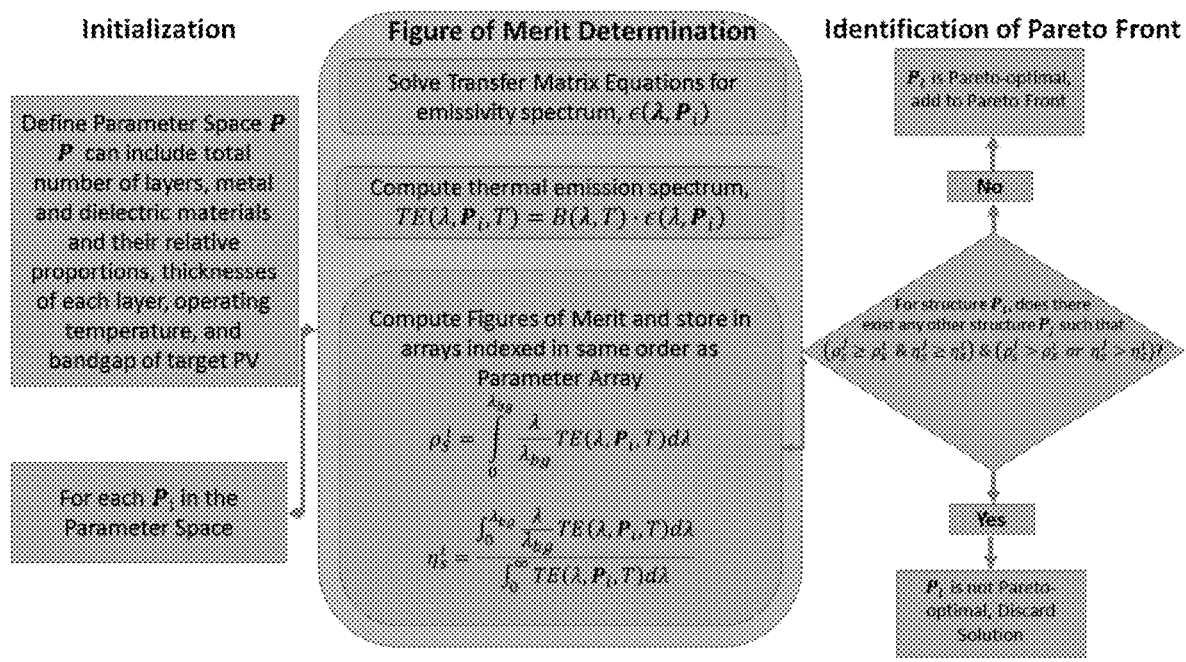
FIG. 17A. Block diagram showing a screen approach for an embodiment where critical coupling is not explicitly considered as a figure of merit.
Figure 17B:
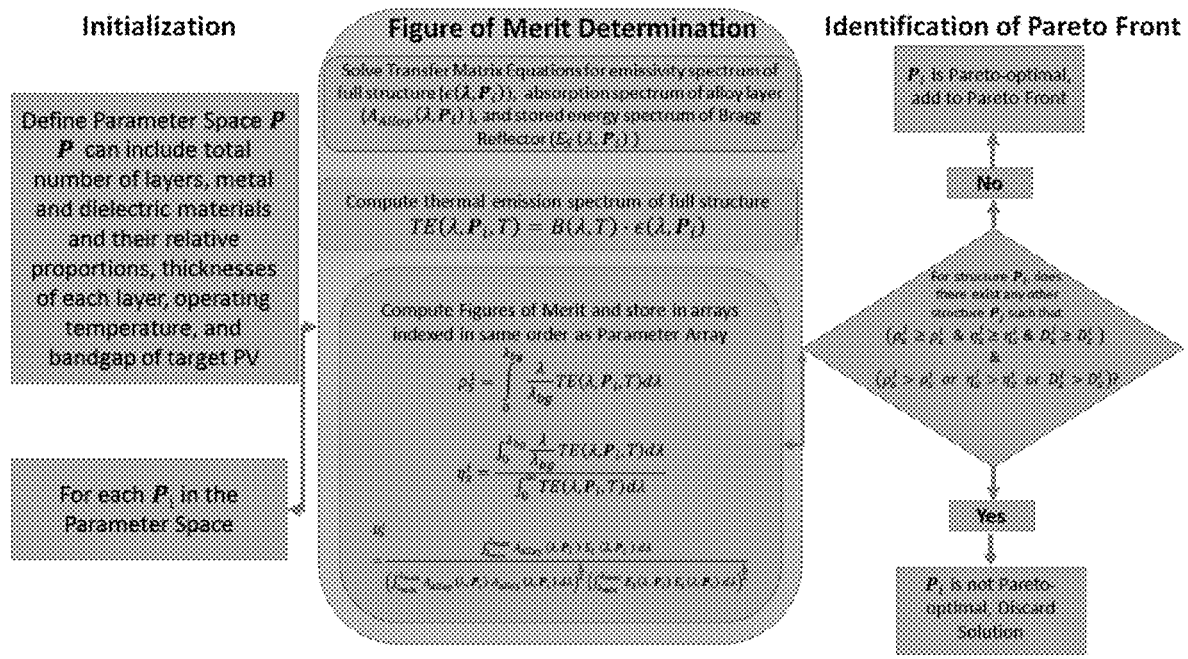
FIG. 17B is a block diagram showing a screen approach for an embodiment where critical coupling is explicitly considered as a figure of merit.

FIG. 15 shows the thermal emission spectra of Alloy/BR/W at 1000° C. calculated from varied alloy models and optical constants of W. Red: measured spectrum; yellow: Bruggeman model with optical constants of ALD W; green: Maxwell-Garnett model with optical constants of ALD W; blue: Maxwell-Garnett model with optical constants of W Palik.

Depending on model to describe refractive index of alloy (Bruggeman vs. Maxwell-Garnett), and that of each constituting element in alloy (Palik W vs. ALD W), the spectral density and spectral selectivity may differ significantly. See Table S4.

TABLE S4

Spectral density P and spectral efficiency $\eta_s$ of alloy + BR + W

| Sample | Measured | B + ALD W | M-G + ALD W | M-G + Palik W |
|---|---|---|---|---|
| P [W/cm$^2$] | 3.0 | 3.1 | 2.2 | 2.0 |
| $\eta_s$ [%] | 35.2 | 49.4 | 54.5 | 55.4 |

Overall Thermophotovoltaic System Efficiency $\eta_{TPV}$ as calculated here does not include other important factors in total thermophotovoltaic system efficiency such as the PV cell ($\eta_{PV}$) and efficiency with which the emitter structure can be heated ($n_Q$); the overall device efficiency will be a product of these two efficiencies with the spectral efficiency ($\eta_s$). 7 The considerations that are required to determine $\eta_{PV}$ are complex and depend on factors including material properties of the cell, the cell temperature, as well as the properties of the incident radiation. An important contributing term to $\eta_{PV}$ is the ratio of the open circuit voltage to the band-gap voltage, $$\frac{V_{op}}{V_{bg}},$$

which increases asymptotically with increasing carrier density generated in the cell. This highlights the practical implications of the emitter figures of merit: a high value of η will reduce thermalization losses in the cell, while a high value of ρ minimizes loss of open-circuit voltage.

The thermophotovoltaic efficiency, $\eta_{tpv}$, of a hypothetical system may be predicted from the parameters of relevant system previously reported. $\eta_{tpv}$ is determined by the ratio of electrical output power density from the solar cells ($P_{el}$) over radiant input power density ($P_{rad}$). This is based on the assumption that the view factor from emitter to cell is unity and energy loss from the side surfaces of the emitter is negligible. The electrical output power density is defined as $$P_{el}=J_{SC}V_{OC}FF \qquad (S20)$$

with $J_{SC}$, $V_{OC}$ and FF, short-circuit current, open circuit voltage, and fill factor, respectively. $J_{SC}$ is given by $$J_{SC}=\int_0^{\lambda_g}E(\lambda)SP(\lambda)d\lambda \qquad (S21)$$

where $E(\lambda)$ and $SP(\lambda)$ are the spectral distribution of emissive power density and the spectral response of the photovoltaic cell.

EXPERIMENTAL EXAMPLES

Described herein are nonlimiting examples corresponding to certain embodiments.

Experimental Methods

Polished tungsten substrates (1 cm$^2$) were sourced from MTI Corporation. The dielectric Bragg reflector was deposited by plasma enhanced atomic layer deposition in a commercial ALD system (Fiji, Cambridge NanoTech Inc.). Aluminum oxide (Al$_2$O$_3$) and W were alloyed by ALD in a tube-style viscous flow reactor similar to those previously reported with a processes adapted from literature. The composition could be tuned over a wide range of values by tuning the ALD cycle ratio at constant temperature. Ex-situ annealing was performed in a high temperature tube furnace (MTI GSL-1700X) under 200 SCCM Ar flow using a bubbler filled with mineral oil. The Ar flow was further purified just prior to entering the furnace with an in-line inert gas scrubber (Entegris CE70KFI4R). Samples were further placed on top of a carbon felt pad, which acts as an oxygen getter at high temperature, in an alumina boat. Although samples with oxide Bragg reflectors are relatively insensitive to the purity of the inert gas atmosphere, bare polished W is exceedingly sensitive.

A Nicolet 6700 FTIR spectrometer with external beam port was used to spectrally resolve the thermal emission of samples heated in a controlled-atmosphere Linkam stage (TS1500). In order to determine the power density in absolute units (W cm$^{-2}$ nm$^{-1}$ sr$^{-1}$) the spectrometer was calibrated with a SiC wafer with format similar to the W substrates. SiC exhibits a thermal emission spectrum with a stable and constant emissivity of ~0.8 over nearly the entire range relevant wavelengths. SiC is also exceptionally resistant to oxidation at high temperatures unlike other commonly used greybody materials such as graphite. The transmittance of the SiC substrate (0.33 mm thickness and one-side polished 4H SiC, MTI corporation) was 3.5% at 1 μm and decreased rapidly to ~0% for longer wavelengths eliminating the possibility of significant contribution from the underlying Al$_2$O$_3$ heater cup. The 7 mm diameter and 3 mm deep sample cup was resistively heated by a nearby Pt coil at a rate of 100° C./min under Ar supply of 60 SCCM. In order to limit the contribution of thermal emission from the heating cup walls (not covered by the substrate) as well as limit the emission angle of acceptance, a ⅛ inch diameter aperture was fixed above the heating stage. The sample emission was reflected by a 90° off-axis paraboloid, before being directed to the external beam port of the FTIR. A sapphire window and CaF$_2$ windows were used for the heating stage and the external beam port of FTIR spectrometer, respectively.

Reflectance spectra of samples were measured via UV-vis-NIR spectrophotometer (Cary 5000) and Nicolet 6700 FTIR with integrating sphere (Mid-IR IntegratIR™).

Results

The planar structures computationally screened (FIG. 2) include optically-thick tungsten (denoted 'W'), variable Bragg reflectors on an optically-thick tungsten substrate (denoted 'BR+W'), and variable W/Alumina alloys with variable Bragg reflectors on an optically-thick tungsten substrate (denoted 'Alloy+BR+W'). It is seen that in each case, the additional degrees of freedom added by the subsequent structures significantly improves the optimal $\eta_s$ and P values that are possible. As such, the Pareto front for the entire solution space is found within the 'Alloy+BR+W' structures. One such Pareto optimal structure and identical structure without alloy are examined in more detail below (denoted 'Select Alloy+BR+W' and 'Select BR+W'). One of the simplest Pareto optimal solutions, a $\Lambda_{BR}=1.5$ Bragg reflector, was selected for detailed consideration, FIG. 3.

Figure 4:
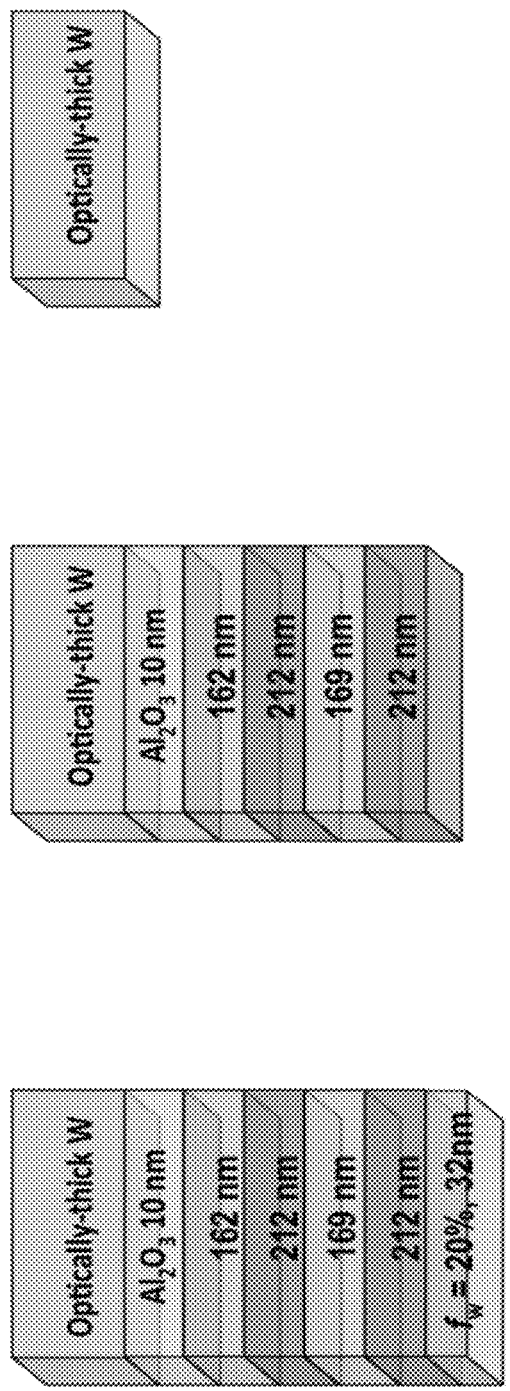
FIG. 4. Theoretical and experimental normal thermal emission of W-only at 973K, BR+W at 1373K, and Alloy+BR+W at 1273K. The shaded region represents error range assuming that the actual temperature of the sample surface is within ±50° C. of the nearby thermocouple.
Figure 4:
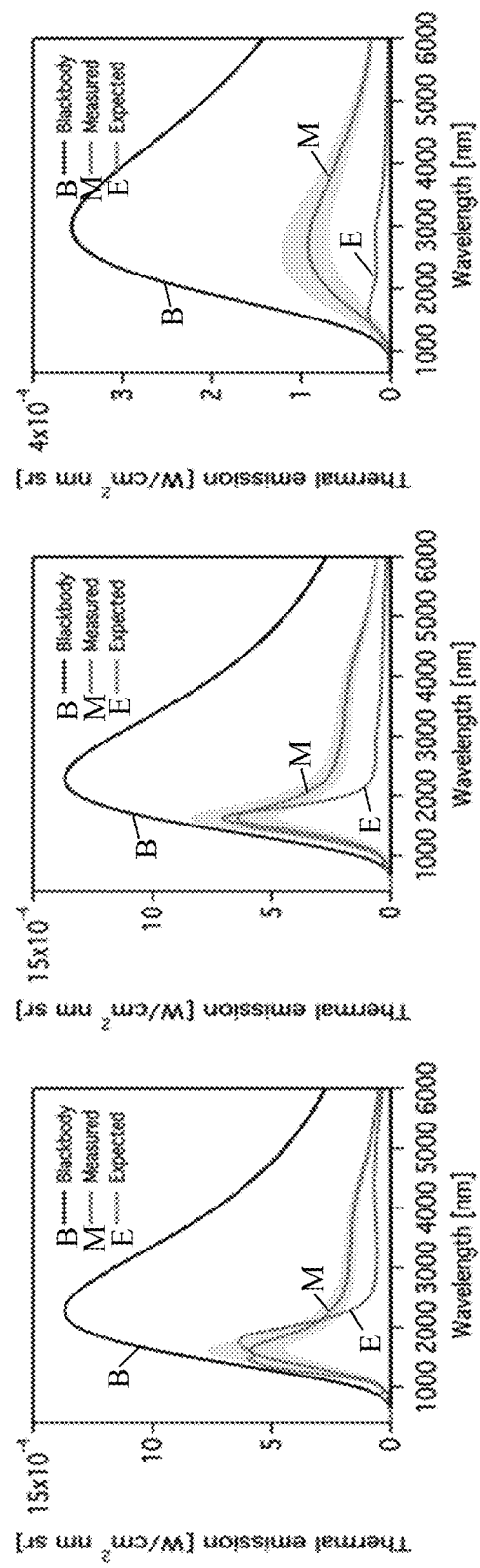
Figure 6:
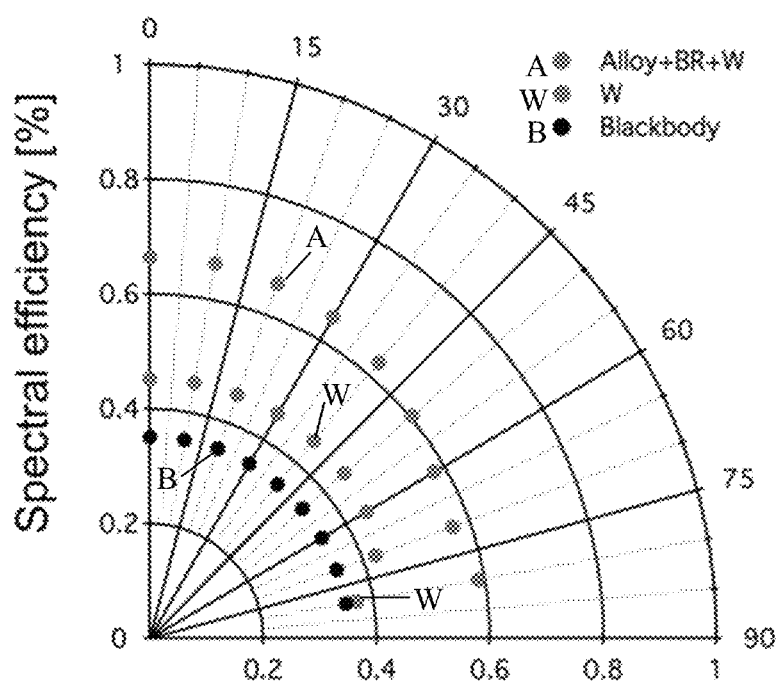
FIG. 6. Spectral efficiency (%) of ideal alloy+BR+W, bare W substrate and blackbody at 1700K calculated as a function of exit angle from 0 to 90°.

The tungsten substrate is seen to be an advantageous base layer as its emissivity is already weighted heavily below the desired bandgap. The addition of the Bragg layer in this case has only a minor impact on the short wavelength emissivity. However, as shown in FIG. 4, properly designed Bragg layers alone can strongly shape the emissivity and substantially improve P and $\eta_s$ compared to bare tungsten. The striking increase in $P_{in}$ upon addition of the alloy can be understood from the emission spectra in FIG. 3, which predicts emission with spectral radiance nearly equal to that of the black body limit ( $(\in(\lambda)=1)$ ) just below the PV bandgap. The peak around 1500 nm is also strongly enhanced. This structure is further predicted to display excellent spectral selectivity over a wide range of angles (see FIG. 6). The virtual screening algorithm used assumes that the emissivity is angle-independent and that the emitted power density decreases as $\cos(\theta)$ where $\theta$ is the emission angle with respect to the normal; a more detailed discussion of angular dependence can be found in the Supporting Information. Under the $\cos(\theta)$ assumption for the angular dependence of the thermal emission, the target structure is calculated to exhibit $\eta_s$ and P of 66% and 10.6 W/cm², respectively at 1700K. Explicit inclusion of the angle dependence of the emissivity of the structure (see the supporting information and Eq. S4) yields remarkably similar performance for the structure illustrated in FIG. 3. This structure is predicted to retain 90% of its spectral selectivity over angles up to 80% and overall and P of 62% and 9.1 W/cm², respectively at 1700K.

Figure 7A:
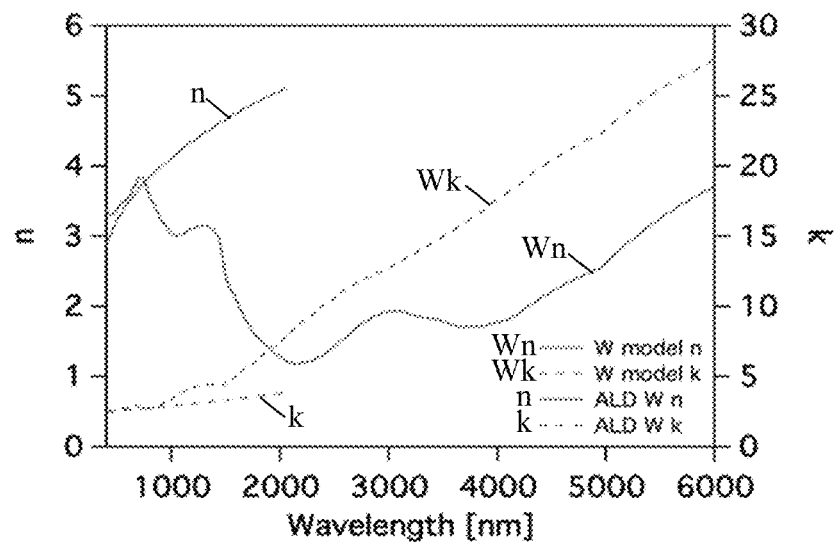
FIG. 7A. Real (n) and imaginary (k) part of refractive index of tungsten.
Figure 7B:
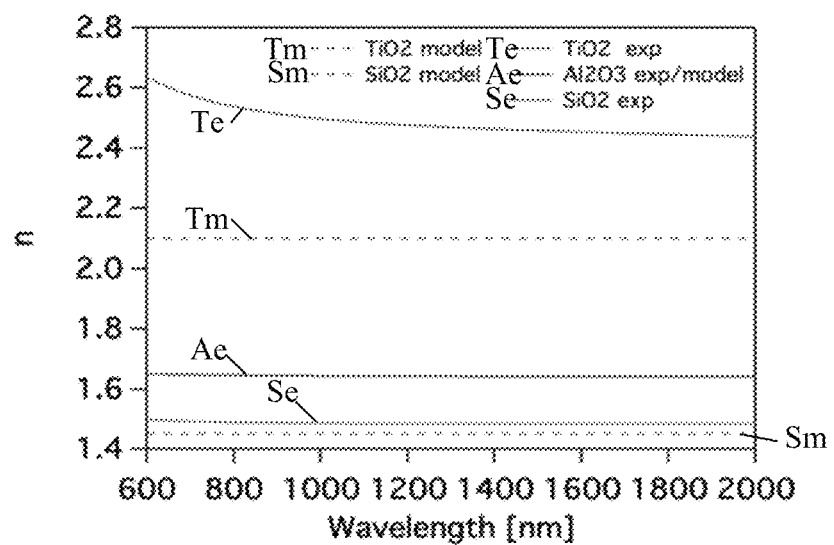
FIG. 7B. Real part of refractive index (n) of oxides. Solid lines are Cauchy-fit of measured n and dashed lines are static values used for initial simulation.

The experimental feasibility of each component in the Pareto optimal target structure was evaluated in turn. The volume fraction of W in $Al_2O_3$ was tuned by cycle ratio in the atomic layer deposition (ALD) process and the thickness controlled by the total number of supercycles. The real and imaginary index of each layer was deduced from spectroscopic ellipsometry to be within 1-3% of the modelled data for oxides and within 13% for the W substrate. The largest deviation was for W grown by ALD (>200%, see FIG. 7), which is known to include a significant fraction of Si and F. Furthermore, the real and imaginary index of the variable fraction alloy was found to be more accurately modeled by a Bruggeman approximation (see discussion in SI). As such, a second computational screening was undertaken that implements the experimentally realized materials properties as inputs. The results, shown in FIG. 8, suggest that good control of the optical constants in each layer is paramount to achieving the best figures-of-merit. In particular, $\eta_s$ is most sensitive to increases in the imaginary part of the refractive index at $\lambda_{bg}>2254$ nm which increase $P_{inc}$ and thereby reduce $\eta_s$.

Pareto optimal structure with BR+W($\Lambda_{BR}=2$) and alloy+BR+W($\Lambda_{BR}=1.5$) were chosen for experimental fabrication at operating temperatures >1000K. After mild densification of the oxide layers, which results in a slight blue-shift of resonances, the reflectance of BR+W and alloy+BR+W samples were observed to remain stable upon annealing at 1273K and 1073K for 2 hr under an atmosphere of dry Ar.

The predicted emission spectra were recalculated with experimentally realized optical constants and thicknesses and compared to experimental emission spectra, FIG. 4.

Emission of bare polished W substrate at 973 K was measured to be larger than expected, likely due to surface oxidation and roughening as indicated by visual evidence of substrate discoloration and significant loss of specular reflection. Even after implementation of an additional water and oxygen scrubber in the inert gas feed, as well as high temperature carbon felt, the purity of the nominally inert atmosphere of the heating stage could not be sufficiently suppressed to avoid the oxidation of the readily oxidized W surface. In contrast to bare W, the alloy+BR+W and BR+W samples maintained the same color and mirror finish after the same emission measurements to even higher temperature. That the oxide layers of BR protect the W surface from oxidation relaxes the requirements on working atmosphere for stable operation, and provides significant temperature stability advantage over previous reports, which may further utilize dilute $H_2$ flow. As predicted, the emissions from BR+W and alloy+BR+W approach that of a blackbody for wavelength less than 2254 nm and are dramatically suppressed at longer wavelengths for the case of BR+W. In both cases, the measured useful power densities were slightly greater than predicted while the measured spectral efficiencies were lower. For BR+W, the primary cause of the enhanced thermal emission in the mid IR range >2000 nm is a change of electron phonon collision frequency at high temperatures, which is not captured in the simulations, leading to higher emissivity and additional undesired emission in this range. The emission of alloy+BR+W for wavelength less than 2254 nm is significantly enhanced to that of W-only and very close to predictions. The alloy+BR+W even more strikingly enhances emission at $\lambda_{bg}<2254$ nm; however, the alloy also results in significant emission in $\lambda_{bg}>2254$ nm, which reverses any potential improvement in $\eta_s$. This discrepancy originates from an imaginary refractive index for ALD-grown W in the alloy that is significantly larger than literature values for pure, bulk W. The $\eta_s$ and P of the oxidized W at 973 K is 15.6% and 0.1 W/cm², BR+W at 1373 K is 46.8% and 2.4 W/cm², and alloy+BR+W at 1273 K is 27.1% and 1.9 W/cm², respectively.

From the above analysis, the overall system efficiency for a thermophotovoltaic system that would implement these emitters may be estimated by using either an idealized, or previously benchmarked, InGaAsSb photovoltaic with parameterized values of open circuit voltage ($V_{OC}$) and fill factor (FF) for a given short-circuit current density ($J_{SC}$), which is calculated by assuming room temperature operation of the cell and 80% external quantum efficiency (EQE) That is, $J_{SC}$ is simply P divided by the voltage corresponding to the useful photons threshold (0.55 V) which is further multiplied by a scalar in the case of the benchmarked device. Table 2 summarizes the predicted thermophotovoltaic conversion efficiency of heat to electrical power, $\eta_{TPV}$, calculated as $$\eta_{TPV} = \frac{J_{SC} V_{OC} FF}{P_{inc}} \quad (5)$$

for (1) an ideal PV cell and the ideal Pareto optimal emitter calculated here, (2) an ideal PV cell and the emitter measured herein, and (3) a previously benchmarked PV cell and the emitter measured herein. We assumed 100% EQE, 0.55 eV $V_{OC}$, and 81.6% FF for the ideal PV. If the heat was provided by a perfect solar absorber then $\eta_{TPV}$ is directly comparable to conventional photovoltaic efficiency. A significant reduction of overall system efficiency (60~70%) is predicted when experimental InGaAsSb PV parameters are used, consistent with literature reports, and point to the need for further improvement in small bandgap PV efficiency.

TABLE 2

Thermophotovoltaic efficiency, $n_{TPV}$ CYO projected for (1) an deal InGaAsSb PV and an optimal theoretically-calculated emitter, (2) an ideal PV and the experimentally-measured emitter, and (3) a previously benchmarked PV cell and the experimentally-measured emitter.

| | Alloy/BRNV at 1273 K | BRNV at 1373 K | (Oxidized) W at 973 K | SiC at 1273 K |
|---|---|---|---|---|
| Ideal PV + Theoretical Emitter | 52.5 | 49.1 | 25.3 | 18.4 |
| Ideal PV + Experimental Emitter | 22.1 | 38.2 | 12.8 | |
| Benchmarked PV + Ideal Emitter | 19.4 | 18.3 | 6.8 | 6.8 |
| Benchmarked PV + Experimental Emitter | 8.2 | 14.0 | 3.9 | |

In the most conservative case in Table 1 (case 3), the $\eta_{tpv}$ projected for our experimental alloy/BR/W or BR/W working at 1273K in a TPV system is 10.6%. Note that the efficiency for the benchmarked PV is not equal in each case because FF and $V_{OC}$ vary with $J_{SC}$. The $\eta_{tpv}$ with either BR+W or alloy+BR+W realized emitter is projected to be greater than that of the InGaAsSb PV alone under standard AM1.5 spectra (~6.3%), signifying that the TPV is improving solar conversion efficiency. However, a more ideal selective emitter or more ideal PV are required to exceed the efficiency of traditional PV (for example, 28.8%). The calculated efficiency, projected from the experimentally realized emitter, is also slightly greater than that of the most efficient experimental system reported to date (~10.2%). The weak-absorber approach implemented herein is also simpler, as it does not include a cool-side selective optical filter on the PV, as in previous reports. The enhanced $\eta_{TPV}$ calculated from experimental emission herein originates largely from the spectral selectivity of the BR and the stabilization of selective emittance at high temperature. Projected $\eta_{TPV}$ values may be further improved by 1) better leveraging the critical coupling approach through improvement of experimental optical properties and 2) increasing the stable operational temperature of the emitter through the use of more stable materials.

As a central hypothesis driving this overall structure design is the critical coupling of the Bragg reflector and thin-film alloy, a metric is defined that quantifies the degree of critical coupling ($D_{CC}$). The condition for critical coupling is that the absorption resonance frequency and bandwidth of the thin-film alloy layer should match the resonance frequency and bandwidth associated with the stored energy spectrum of the Bragg reflector, which can be derived from the transfer matrix equations (see Supporting Information). A natural way to define the degree of critical coupling is therefore to compute the overlap of the absorption spectrum of the alloy ($A_{Alloy}(\lambda)$) with the stored energy spectrum of the Bragg reflector ($E_S(\lambda)$)

$$D_{CC} = \frac{\int_{\lambda_{min}}^{\lambda_{max}} A_{Alloy}(\lambda) E_S(\lambda) d\lambda}{\left(\int_{\lambda_{min}}^{\lambda_{max}} A_{Alloy}(\lambda) A_{alloy}(\lambda) d\lambda\right)^{\frac{1}{2}} \left(\int_{\lambda_{min}}^{\lambda_{max}} E_S(\lambda) E_s(\lambda) d\lambda\right)^{\frac{1}{2}}} \quad (6)$$

Figure 5A:
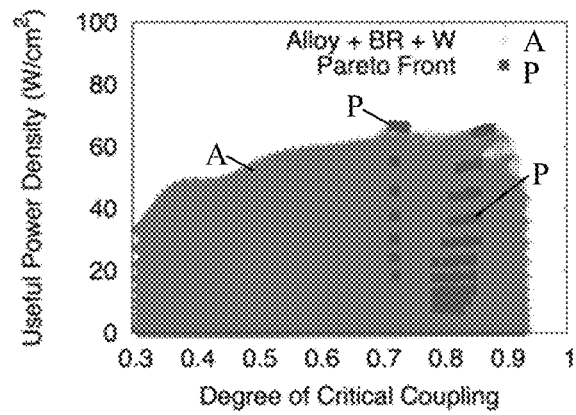
FIGS. 5A-5B. Comparison of possible values for P and $\eta_s$ plotted against degree of critical coupling for emitters at temperatures between 1200K and 2200K when $\lambda_{BG}$=2254 nm.
Figure 5B:
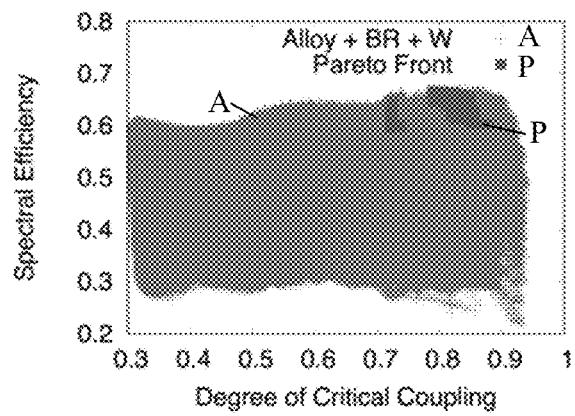

That a high degree of critical coupling is characteristic of a Pareto optimal solution in this study can be seen in FIG. 5. The optimal solutions all exhibit a relatively high degree of critical coupling with values near 0.7 and 0.9. However, interestingly, the highest degrees of critical coupling are not associated with simultaneously high and P as seen by only non-optimal solutions with $D_{CC}$>0.9.

CONCLUSIONS

The critical coupling approach to selective emission provides a clear path to solar thermophotovoltaic efficiency that could exceed the 42% conversion limit of single gap photovoltaics under concentrated sunlight. Pareto optimal emitters enable tunable emission with exceptionally simple planar stacks based on less than six layers. In one embodiment, the layer without the need for two-dimensional patterning. This approach provides contrast to recent trends toward more complex nanostructured selective emitters, although it may not be incompatible with it. Experimental validation of one optimal solution results in a good match to the predicted selective emission structure after accounting for experimental non-idealities, most notably a weak absorber alloy layer with non-ideal optical properties. Additional development of more thermally stable oxides and more tunable and temperature stable weakly absorbing alloys are expected to further increase the experimentally achievable emitter figures-of-merit and, thereby, themophotovoltaic system efficiency.

Figure 18:
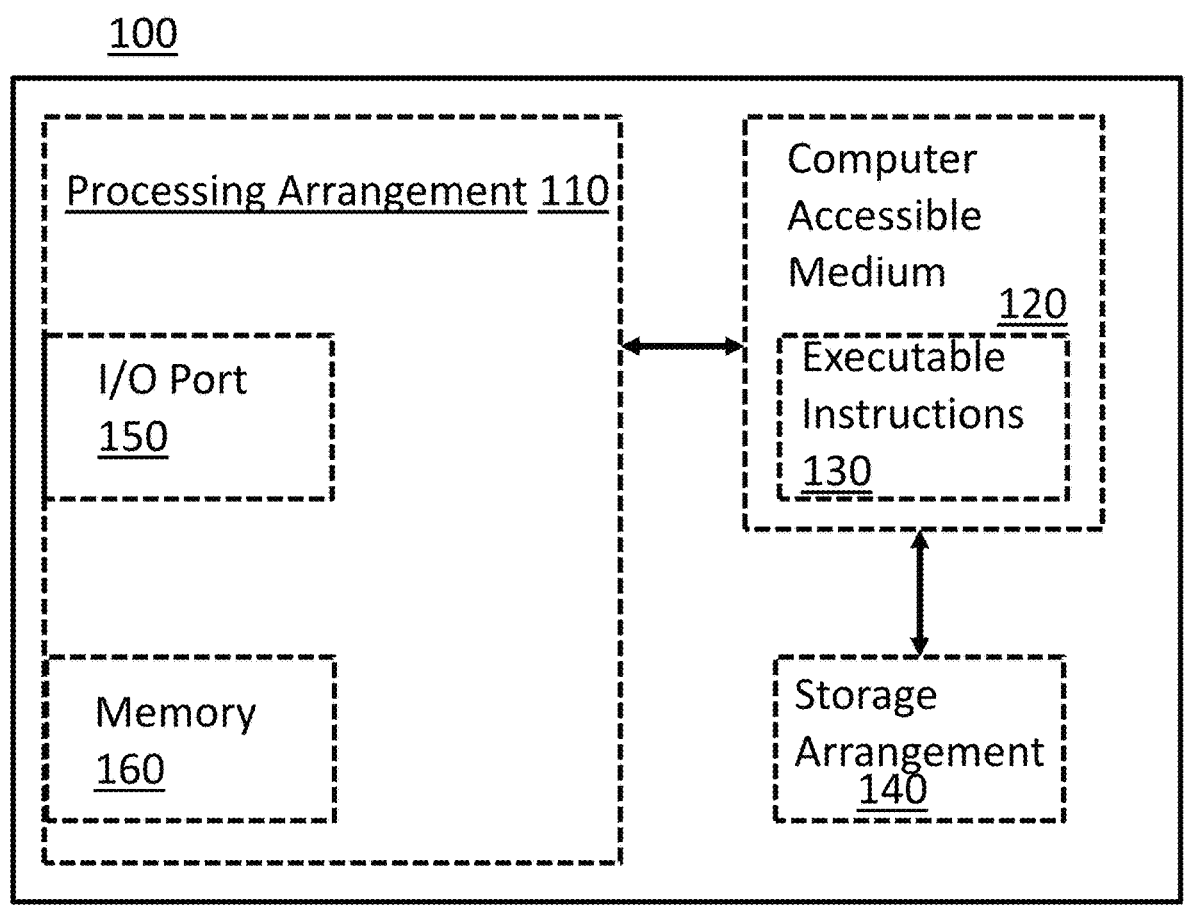
FIG. 18. Computer system for use with certain implementations.

As shown in FIG. 18, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The instructions may include a plurality of sets of instructions such as for carrying out the Pareto optimization described herein.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer implemented system for identifying photonic crystals comprising:
    a processor; and
    a tangible computer-readable medium operatively connected to the processor and including computer code configured to:
        determine emissivity for candidate emitter structures;
        select an absorber to pair with the candidate emitter structures;
        determine spectral conversion efficiency ($\eta_s$) and useful power (P) as figures of merit;
        perform a Pareto optimization using the figures of merit; and
        determine a degree of critical coupling of at least a portion of the candidate emitter structures and the selected absorber.

2. The computer implemented system of claim 1, further comprising computer code configured to:
    select an operating temperature for a photovoltaic.

3. The computer implemented system of claim 1, wherein the figures of merit are spectral conversion efficiency ($\eta_s$) and useful power (P).

4. The computer implemented system of claim 1, further comprising computer code configured to, prior to identifying if a parameter is Pareto optimal, determine absorption spectrum for an alloy layer of the candidate emitter structure.

5. The computer implemented system of claim 4, further comprising computer code configured to, prior to identifying if a parameter is Pareto optimal, determine stored energy spectrum of a Bragg reflector of the candidate emitter structure.

6. The computer implemented system of claim 5, wherein the parameters are selected from the group consisting of Bragg reflector dielectric layer thicknesses, Bragg reflector refractive indices, Bragg reflector number of such pair layers, $\Lambda_{BR}$ and the alloy layer composition, operating temperature, bandgap of an associated photovoltaic.

7. The computer implemented system of claim 5, wherein the candidate emitter comprises a refractory metal, the Bragg reflector and the alloy layer.

8. The computer implemented system of claim 7, wherein the refractory metal is tungsten and the alloy layer is $W-Al_2O_3$ alloy.

* * * * *